US012069144B1

(12) United States Patent
Eberhardt et al.

(10) Patent No.: US 12,069,144 B1
(45) Date of Patent: Aug. 20, 2024

(54) PERSONALIZED DEVICE ROUTINES

(71) Applicant: Amazon Technologies, Inc., Seattle, WA (US)

(72) Inventors: Sven Eberhardt, Seattle, WA (US); Soyoung Kim, Vancouver (CA); Maisie Wang, Seattle, WA (US); Kunal Pramod Ghogale, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/080,559

(22) Filed: Dec. 13, 2022

Related U.S. Application Data

(60) Provisional application No. 63/416,155, filed on Oct. 14, 2022.

(51) Int. Cl.
| | | |
|---|---|---|
| *G06F 15/16* | (2006.01) |
| *H04L 67/303* | (2022.01) |
| *H04L 67/306* | (2022.01) |
| *H04L 67/50* | (2022.01) |
| *H04L 67/51* | (2022.01) |

(52) U.S. Cl.
CPC .......... *H04L 67/535* (2022.05); *H04L 67/303* (2013.01); *H04L 67/306* (2013.01); *H04L 67/51* (2022.05)

(58) Field of Classification Search
CPC ..... H04L 67/535; H04L 67/51; H04L 67/303; H04L 67/306
USPC .......................................................... 709/217
See application file for complete search history.

(56) References Cited

U.S. PATENT DOCUMENTS

| | | | | |
|---|---|---|---|---|
| 10,904,027 | B1 * | 1/2021 | Basak | H04L 12/2816 |
| 11,715,051 | B1 * | 8/2023 | Baskaran | G06F 18/2178 |
| | | | | 707/758 |
| 2019/0370139 | A1 * | 12/2019 | Vichare | G06F 9/44505 |
| 2019/0373101 | A1 * | 12/2019 | Dotan-Cohen | H04M 1/72451 |

* cited by examiner

*Primary Examiner* — Alan S Chou
(74) *Attorney, Agent, or Firm* — Lee & Hayes, P.C.

(57) ABSTRACT

Systems and methods for personalized device routines include determining devices associated with user account data and generating device usage data indicating aspects of smart device usage over a period of time. The usage data may then be utilized to identify candidate smart devices, time indicators, and trigger event types to associate with candidate routines. One or more of the candidate routines may be recommended to a user based at least in part on the usage data and the trigger event types at issue to personalize the device routine recommendations.

20 Claims, 18 Drawing Sheets

| Trigger Event Type 250 | Response 252 |
|---|---|
| Voice-Based Trigger<br>Example: "I'm home" | Example: Hallway light turns on; fireplace turns on; temperature setting on thermostat adjusts |
| Link-Based Trigger<br>Example: First device transitions device state | Example: Second device transitions device state |
| Time-Based Trigger<br>Example: Device clock indicates time is 9:00pm | Smart light turns off |
| Duration-Based Trigger<br>Example: 30 minutes has lapsed since occurrence of event | Example: Fireplace turns off 30 minutes after being turned on |
| Light-Based Trigger<br>Example: Sunset is detected | Example: Smart lights in the device group "living room lights" turn on |
| Presence-Based Trigger<br>Example: User presence is detected in given environment | Example: Smart TV turns on |

PERSONALIZED DEVICE ROUTINES

PRIORITY

This patent application claims priority to U.S. Provisional Patent Application No. 63/416,155, filed Oct. 14, 2022, and entitled "PERSONALIZED DEVICE ROUTINES," which is fully incorporated by reference herein in its entirety.

BACKGROUND

Devices, including voice interface device, have become available. Some of these devices may be utilized to perform actions in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2B illustrates a table showing example trigger event types and corresponding example responses.

DETAILED DESCRIPTION

Figure 1:
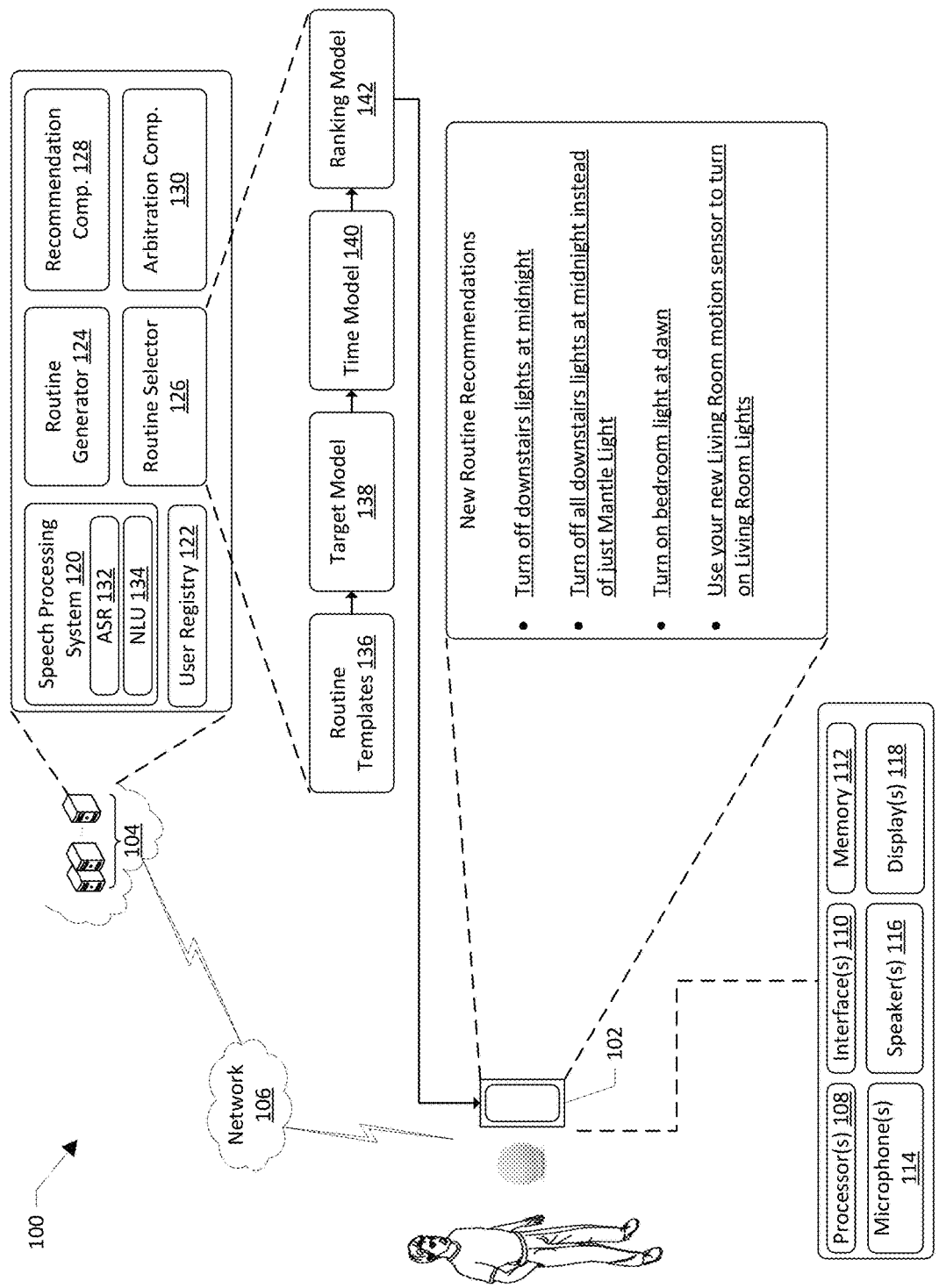
FIG. 1 illustrates a schematic diagram of an example environment for personalized device routines.

Systems and methods for personalized device routines are disclosed, among other things. Take, for example, an environment (such as a home, hotel, vehicle, office, store, restaurant, or other space) where one or more users may be present. The environments may include one or more electronic devices that may be utilized by the users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode"), smart cameras (e.g., home security cameras), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example.

In these and other scenarios, the devices described herein may be associated with "routines." As used herein, routines describe processes that are performed in association with device(s) when a trigger event is detected. Example routines may include a particular light device turning on when presence is detected by a given device, a light device turning off at a particular time of day and/or when a given environmental condition occurs such as detection of sunrise and/or sunset, a given device being operated when another device is operated (including when the device operation is caused by given input types such as a voice command), a given device being operated after a certain amount of time has passed since the device and/or another device was last operated, etc. With the introduction of new types of smart home devices, the potential trigger events, responsive actions, and combinations of the two in a routine has expanded and thus presented an opportunity to invent new technology to, e.g., automate at least a portion of these device operations.

Given the above, the desirability of recommending targeted and personalized device routines has also increased. To do so, the present innovation may include utilizing usage data (among other data) to determine personalized device routine recommendations. In examples, a system may be utilized over time to assist in controlling devices associated with given user account data. For example, users may provide voice commands to voice interface devices to operate those voice interface devices and/or smart devices associated therewith. Additionally, users may provide other types of commands such as by providing user input to an application on a user device such as a smartphone to control the devices associated with given user account data. Usage history data indicating, for example, what devices were operated, when those devices were operated, how those devices were operated, relationships between devices, routines that have been setup by users, and in some examples which user profiles were utilized to operate certain devices may be generated and stored in a user registry associated with the user account data.

Thereafter, a routine generator of the system may be configured to determine candidate device routines utilizing at least the usage data associated with the user account data, and/or in some examples utilizing usage data associated with other user accounts. The routine generator may be configured to determine which of the devices associated with the user account data should be recommended for a routine and the potential trigger events to be associated with the routine. The routine generator may also be responsible for the generation of data representing the routine if the routine recommendation is accepted. The data representing the routine may be data that causes one or more of the devices in an environment to detect the trigger event associated with the routine, and when such a trigger event is detected, the data may cause the one or more devices to perform an action associated with the routine. The data representing the routine may be stored on the devices in the environment and/or may be stored in a system remote from the devices in the environment and may be called upon when the specific trigger event in question is detected.

When determining which of several candidate routine recommendations to surface to a user, a routine selector may be utilized. The routine selector may be configured to receive the candidate device and trigger event combinations from the routine generator and may utilize these candidate routines in association with the usage data described herein to rank the candidate routines or otherwise to select one or more of the candidate routines to recommend. To do so, the routine selector may initially determine one or more routine templates that are available for the device(s) being considered. Such routine templates may be based at least in part on trigger event types that may be associated with a given routine. Example trigger event types include, for example, a presence template indicating that an action is to be performed by a device when presence is detected and/or when presence of a particular user is detected. Another example trigger event type may be associated with a duration template indicating that an action is to be performed by a device after a certain amount of time has lapsed since a defined event occurred. Another example trigger event type may include a fixed time template indicating that an action is to be performed when a fixed time (e.g., 6:00 am, noon, etc.) occurs. Another example trigger event type may be associated with an environmental template indicating that an action is to be performed when a certain environmental condition is detected, such as when certain weather is detected, when sunrise and/or sunset occurs, when certain temperatures are detected, etc. It should be understood that these routine templates are provided by way of example and not as the exclusive types of routine templates. For example, other routine templates may be based on trigger event types such as device-linkage templates where an action may be performed by a given device when another device is operated, etc. It should also be understood that while device actions are described by way of example when a trigger event is detected, such as a light being turned on and/or off, the device actions may include any action that the devices are configured to take, including, again by way of example, lights turning on and off, doors locking and unlocking, thermostats changing temperature settings, televisions changing channels, volumes, etc., window treatments closing and opening, fireplaces turning on and off, fans turning on and off, garage doors opening and closing, appliances being operated, motion sensors enabling and disabling, etc. It should also be understood that triggers as described herein may be combined and that the user of single triggers are provided throughout this disclosure by way of example for the sake of clarify. For example, a given smart light may be turned on at a given time if user presence is detected. In this example, a time-based trigger and a presence-based trigger are utilized in combination to determine when the light in question should be turned on (and/or that a state change should otherwise occur).

The routine selector may then utilize a target model to determine which of the devices associated with the user account data may be associated with a recommended routine. In some examples, the target model may be utilized to identify each of the individual devices associated with the user account data as well as device groups associated with the user account data. These device groups may have been previously setup by a user associated with the user account data and/or by the system described herein. In examples, the target model may be configured to determine whether to associate an individual device with a recommended routine even when that individual device is associated with a device group. In other examples, the target model may be configured to determine whether to associate a group of devices with a recommended routine even when individual devices are not associated with a device group in the user account data. For example, the usage data may indicate that while a given device is associated with a device group, the routine to be recommended is most likely to be utilized for only the individual device at issue instead of all the devices in a device group. A specific example of this may be when several devices are associated with a kitchen device group, such as several smart lights, smart appliances, and a voice interface device. The target model may determine that the routine at issue is associated with the operation of smart lights and then may determine to exclude the smart appliances and the voice interface device in the kitchen group from the recommended routine to operate the smart lights in the kitchen group. In another specific example, the usage data may indicate that two devices are operated together frequently even though those devices are not formally associated with the same device group in the user account data. In this example, the target model may determine to associate the devices with each other for purposes of recommending a routine even though the devices are not part of a device group.

Once the target devices are determined, the routine selector may utilize a time model, which may be configured to determine candidate times and/or time-related triggers that may be applicable to the target device at issue for a given candidate routine. For example, the usage data for the user account may indicate that, for the target device(s) at issue, the target device(s) are operated within a certain time range during a given day, the target device(s) are operated within a certain duration of when another event occurs, the target device(s) are operated in association with given environmental conditions occurring such as sunset and/or sunrise, etc. Utilizing this information, the time model may be configured to determine candidate timing indicators that may be associated with the routine at issue.

Additionally, the routine selector may utilize a ranking model, which may be configured to determine which trigger event type to associate with a given routine. As described above, various trigger event types may be candidates for use in a given routine. The ranking model may utilize the usage data described herein to determine which of the trigger event types may be most desirable for a given routine. For example, the usage data may indicate that a certain smart light is turned off each day at or around the same time. This usage data may indicate that a time-based trigger event type is preferrable for the recommended routine. In other examples, the usage data may indicate that the smart light is turned on each day at various times that correspond to when sunset occurs. This usage data may indicate that a light-based trigger event type is preferrable for the recommended routine. In still other examples, the usage data may indicate that a smart light is turned off after a certain period of time from when a voice command is provided. This usage data may indicate that a duration-based trigger event type is preferrable for the recommended routine. It should be understood that these examples are illustrative and not limiting, and that other usage data and trigger event type determinations based on such usage data are included in this disclosure.

At this point, the routine selector may utilize the output from the routine templates, the target model, the time model, and/or the ranking model to determine one or more device routines to recommend. These candidate routines may be ranked and/or deduplicated in instances where several candidate routines have similar parameters. A recommendation component of the system may be configured to receive data representing the selected device routine recommendation(s) from the routine selector and may be configured to generate a recommendation to implement the selected routine(s). The recommendation may take various forms, such as data configured to be presented on an application residing on a user's personal device, audio data configured to be utilized to output audio representing the recommendation, image data configured to be utilized to output images that include the recommendation, etc. The data representing the recommendation may be sent to one or more devices associated with the user account data, and those recommendations may be interacted with by a user to accept or reject the recommendations. For example, when the recommendations are displayed on a user device, the recommendations may be configured as an interactive link that, when selected, causes user input data to be generated that indicates acceptance of the recommendation. This user input data may be sent to the routine generator, which may implement the recommended routine as described herein. When user interaction (or lack thereof) indicates rejection of the recommendation, data indicating this rejection may be generated and sent to the routine selector, which may utilize such data as a negative dataset for at least one of the target model, the time model, and/or the ranking model when subsequent routine recommendations are generated.

In addition to the above, an arbitration component of the system may be utilized to arbitrate between recommended routines and preexisting routines associated with user account data. For example, a recommended routine may be generated as described above. Additionally, the arbitration component may determine whether one or more preexisting routines are associated with given user account data. When at least one preexisting routine is associated with the user account data, the arbitration component may determine whether a device from the recommended routine is included in the preexisting routine. When such device overlap occurs, the arbitration component may also determine whether there is overlap between a trigger event associated with the recommended routine and a trigger event associated with the preexisting routine. When such overlap between devices and trigger events occurs, the arbitration component may determine an arbitration action to take such that conflicting routines are not recommended and setup for the user account. The arbitration action may include determining that while device and trigger overlap is determined, operation of the device in question differs as between the recommended routine and preexisting routine, such as when the preexisting routine is to turn off a smart light at sunrise and the recommended routine is to turn on the same smart light at sunset. This may lead to the recommended routine being recommended as an additional routine to be added to the user account data. In other examples, the arbitration action may include determining to discard the recommended routine because a conflict is determined as between the recommended routine and the preexisting routine. In still other examples, the arbitration action may include determining to replace or combine the preexisting routine with the recommended routine. An example of this may be when a preexisting routine is to cause a given device to perform a given action when a trigger event is detected and when the recommended routine is to cause that device and another device to perform the given action. In this example, the recommendation may be to replace or combine the preexisting routine with the more inclusive recommended routine.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for personalized device routines. The system 100 may include, for example, a voice interface device 102 and one or more smart devices (not shown). In certain examples, the smart devices themselves may be a voice-enabled device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In some examples, the devices may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. The devices may be configured to send data to and/or receive data from a system 104, such as via a network 106. It should be understood that where operations are described herein as being performed by the system 104, some or all of those operations may be performed by the devices. It should also be understood that anytime the system 104 is referenced, that system may include any system and/or device, whether local to an environment of the devices or remote from that environment. Additionally, it should be understood that a given space and/or environment may include numerous devices. It should also be understood that when a "space" or "environment" is used herein, those terms mean an area of any size and delineation and can include but are not necessarily limited to a given room, building, or other structure, unless otherwise specifically described as such.

The voice interface devices 102 may include one or more components, such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the system 104. The voice interface device 102 may be configured to detect an environmental condition associated with the smart devices and/or the environment associated with the smart devices. Some example sensors that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors, usage data and/or account data may be utilized to determine if an environmental condition is present. In some examples, the sensors may also include radar and/or ultrasonic sensors.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 120, a user registry 122, a routine generator 124, a routine selector 126, a recommendation component 128, and/or an arbitration component. It should be understood that while the components of the system 104 are depicted and/or described as separate from each other in FIG. 1, some or all of the components may be a part of the same system. The speech processing system 120 may include an automatic speech recognition component (ASR) 132 and/or a natural language understanding component (NLU) 134. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 134 and/or as determined from user input via a computing device. Skills may be configured to utilize the intent to output data for input to a text-to-speech component, a link or other resource locator for audio data, and/or a command to a device, such as the smart devices. "Skills" may include applications running on devices, such as the smart devices, and/or may include portions that interface with voice user interfaces of smart devices.

In instances where a voice-enabled device is utilized, skills may extend the functionality of smart devices that can be controlled by users utilizing a voice-user interface. In some examples, skills may be a type of application that may be useable in association with target devices and may have been developed specifically to work in connection with given target devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 122 may be configured to determine and/or generate associations between users, user accounts, environment identifiers, and/or devices. For example, one or more associations between user accounts may be identified, determined, and/or generated by the user registry 122. The user registry 122 may additionally store information indicating one or more applications and/or resources accessible to and/or enabled for a given user account. Additionally, the user registry 122 may include information indicating device identifiers, such as naming identifiers, associated with a given user account, as well as device types associated with the device identifiers. The user registry 122 may also include information indicating user account identifiers, naming indicators of devices associated with user accounts, and/or associations between devices, such as the smart devices. The user registry 122 may also include information associated with usage of the smart devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 120 may be configured to receive audio data from the voice interface devices 102 and/or other devices and perform speech-processing operations. For example, the ASR component 132 may be configured to generate text data corresponding to the audio data, and the NLU component 134 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "turn on bedrooms lights," the NLU component 134 may identify a "smart home" intent. In this example where the intent data indicates an intent to cause a smart device to operate, the speech processing system 122 may call one or more speechlets and/or applications to effectuate the intent, such as a smart home system. Speechlets, as described herein may otherwise be described as applications and may include functionality for utilizing intent data to generate directives and/or instructions. A speechlet of the smart home system may be designated as being configured to handle the intent of causing smart devices to perform actions, for example. The smart home system may receive the intent data and/or other data associated with the user utterance from the NLU component 134, such as by an orchestrator of the system 104, and may perform operations to cause an action to be performed by the device in question, for example. The system 104 may generate audio data confirming that the action has been performed, such as by a text-to-speech component. The audio data may be sent from the system 104 to one or more of the smart devices.

The components of the system 100 are described below by way of example. To illustrate, the present innovation may include utilizing usage data (among other data) to determine personalized device routine recommendations. In examples, the system 104 may be utilized over time to assist in controlling smart devices associated with given user account data. For example, users may provide voice commands to voice interface devices 102 to operate those voice interface devices 102 and/or smart devices associated therewith. Additionally, users may provide other types of commands such as by providing user input to an application on a user device such as a smartphone to control the smart devices associated with given user account data. Usage data indicating what smart devices were operated, when those devices were operated, how those devices were operated, relationships between devices, routines that have been setup by users, and in some examples which user profiles were utilized to operate certain devices may be generated and stored in the user registry 122.

Thereafter, the routine generator 124 may be configured to determine candidate device routines utilizing at least the usage data associated with the user account data, and/or in some examples utilizing usage data associated with other user accounts. The routine generator 124 may be configured to generate data representing the routine if the routine recommendation is accepted. The data representing the routine may be data that causes one or more of the voice interface devices 102 and/or the smart devices in an environment to detect the trigger event associated with the routine, and when such a trigger event is detected, the data may cause the one or more devices to perform an action associated with the routine. The data representing the routine may be stored on the voice interface devices 102 and/or the smart devices in the environment and/or may be stored in the system 104 and may be called upon when the specific trigger event in question is detected.

When determining which of several candidate routine recommendations to surface to a user, the routine selector 126 may be utilized. The routine selector 126 may be configured to receive the candidate device and trigger event combinations from the routine generator 124 and may utilize these candidate routines in association with the usage data described herein to rank the candidate routines or otherwise to select one or more of the candidate routines to recommend. To do so, the routine selector 126 may initially determine one or more routine templates 136 that are available for the smart device(s) at issue. Such routine templates 136 may be based at least in part on trigger event types that may be associated with a given routine. Example trigger event types include, for example, a presence template indicating that an action is to be performed by a smart device when presence is detected and/or when presence of a particular user is detected. Another example trigger event type may include a duration template indicating that an action is to be performed by a smart device after a certain amount of time has lapsed since a defined event has occurred. Another example trigger event type may include a fixed time template indicating that an action is to be performed when a fixed time (e.g., 6:00 am, noon, etc.) occurs. Another example trigger event type may include an environmental template indicating that an action is to be performed when a certain environmental condition is detected, such as when certain weather is detected, when sunrise and/or sunset occurs, when certain temperatures are detected, etc. It should be understood that these routine templates 136 are provided by way of example and not as the exclusive types of routine templates 136. For example, other routine templates 136 may be based on trigger event types such as device-linkage templates where an action may be performed by a given smart device when another device is operated, etc. It should also be understood that while device actions are described by way of example when a trigger event is detected, such as a light being turned on and/or off, the device actions may include any action that the devices are configured to take, including, again by way of example, lights turning on and off, doors locking and unlocking, thermostats changing temperature settings, televisions changing channels, volumes, etc., window treatments closing and opening, fireplaces turning on and off, fans turning on and off, garage doors opening and closing, appliances being operated, motion sensors enabling and disabling, etc.

The routine selector 126 may then utilize a target model 138 to determine which of the smart devices associated with the user account data may be associated with a recommended routine. In some examples, the target model 138 may be utilized to identify each of the individual devices associated with the user account data as well as device groups associated with the user account data. These device groups may have been previously setup by a user associated with the user account data and/or may be setup by the system 104 described herein. The target model 138 can determine any combination of the available devices for use in combination with a given template including use of individual devices, any subset of the devices, a group, a set of groups, and any combination thereof. In examples, the target model 138 may be configured to determine whether to associate an individual device with a recommended routine even when that individual device is associated with a device group. In other examples, the target model 138 may be configured to determine whether to associate a group of devices with a recommended routine even when individual devices are not associated with a device group in the user account data. For example, the usage data may indicate that while a given device is associated with a device group, the routine to be recommended is most likely to be utilized for only the individual device at issue instead of all the devices in a device group. A specific example of this may be when several devices are associated with a kitchen device group, such as several smart lights, smart appliances, and a voice interface device. The target model 138 may determine that the routine at issue is associated with the operation of smart lights and then may determine to exclude the smart appliances and the voice interface device 102 in the kitchen group from the recommended routine to operate the smart lights in the kitchen group. In another specific example, the usage data may indicate that two devices are operated together frequently even though those devices are not formally associated with the same device group in the user account data. In this example, the target model 138 may determine to associate the devices with each other for purposes of recommending a routine for those devices even though the devices are not part of a device group.

Once the target devices are determined, the routine selector 126 may utilize a time model 140, which may be configured to determine candidate times and/or time-related triggers that may be applicable to the target device at issue for a given candidate routine. For example, the usage data for the user account may indicate that, for the target device(s) at issue, the target device(s) are operated within a certain time range during a given day, the target device(s) are operated within a certain duration of when another event occurs, the target device(s) are operated in association with given environmental conditions occurring such as sunset and/or sunrise, etc. Utilizing this information, the time model 140 may be configured to determine candidate timing indicators that may be associated with the routine at issue.

Additionally, the routine selector 126 may utilize a ranking model 142, which may be configured to rank trigger event types that may be associated with a given routine. As described above, various trigger event types may be candidates for use in a given routine. The ranking model 142 may utilize the usage data described herein to determine which of the trigger event types may be most desirable for a given routine. For example, the usage data may indicate that a certain smart light is turned off each day at or around the same time. This usage data may indicate that a time-based trigger event type is preferrable for the recommended routine. In other examples, the usage data may indicate that the smart light is turned on each day at various times that correspond to when sunset occurs. This usage data may indicate that a light-based trigger event type is preferrable for the recommended routine. In still other examples, the usage data may indicate that a smart light is turned off after a certain period of time from when a voice command is provided. This usage data may indicate that a duration-based trigger event type is preferrable for the recommended routine. It should be understood that these examples are illustrative and not limiting, and that other usage data and trigger event type determinations based on such usage data are included in this disclosure.

At this point, the routine selector 126 may utilize the output from the routine templates 136, the target model 138, the time model 40, and/or the ranking model 142 to determine one or more device routines to recommend. These candidate routines may be ranked and/or deduplicated in instances where several candidate routines have similar parameters. The recommendation component 128 may be configured to receive data representing the selected device routine recommendation(s) from the routine selector 126 and may be configured to generate a recommendation to implement the selected routine(s). The recommendation may take various forms, such as data configured to be presented on an application residing on a user's personal device, audio data configured to be utilized to output audio representing the recommendation, image data configured to be utilized to output images that include the recommendation, etc. The data representing the recommendation may be sent to one or more devices associated with the user account data, or by other mechanisms such as an email or similar notification, and those recommendations may be interacted with by a user to accept or reject the recommendations. For example, when the recommendations are displayed on a user device, the recommendations may be configured as an interactive link that, when selected, causes user input data to be generated that indicates acceptance of the recommendation. This user input data may be sent to the routine generator 124, which may implement the recommended routine as described herein. When user interaction (or lack thereof) indicates rejection of the recommendation, data indicating this rejection may be generated and sent to the routine selector 126, which may utilize such data as a negative dataset for at least one of the target model 138, the time model 140, and/or the ranking model 142 when subsequent routine recommendations are generated.

In addition to the above, the arbitration component 130 may be utilized to arbitrate between recommended routines and preexisting routines associated with user account data. For example, a recommended routine may be generated as described above. Additionally, the arbitration component 130 may determine whether one or more preexisting routines are associated with given user account data. When at least one preexisting routine is associated with the user account data, the arbitration component 130 may determine whether a device from the recommended routine is included in the preexisting routine. When such device overlap occurs, the arbitration component 130 may also determine whether there is overlap between a trigger event associated with the recommended routine and a trigger event associated with the preexisting routine. When such overlap between devices and trigger events occurs, the arbitration component 130 may determine an arbitration action to take such that conflicting routines are not recommended and setup for the user account. The arbitration action may include determining that while device and trigger overlap is determined, operation of the device in question differs as between the recommended routine and preexisting routine, such as when the preexisting routine is to turn off a smart light at sunrise and the recommended routine is to turn on the same smart light at sunset. This may lead to the recommended routine being recommended as an additional routine to be added to the user account data. In other examples, the arbitration action may include determining to discard the recommended routine because a conflict is determined as between the recommended routine and the preexisting routine. In still other examples, the arbitration action may include determining to replace the preexisting routine with the recommended routine. An example of this may be when a preexisting routine is to cause a given device to perform a given action when a trigger event is detected and when the recommended routine is to cause that device and another device to perform the given action. In this example, the recommendation may be to replace to preexisting routine with the more inclusive recommended routine.

With respect to the recommended routines as described herein, a recommendation identification system for tracking individual impressions, acceptances, and dismissals may be utilized. The initial recommendation identifier may be based on concatenating a domain, scope, and entity identifier for a use case. The system 104 may also utilize an obfuscated identifier based at least in part on hashing the routine payload. This may allow the system 104 to track more complex cases. A routines recommendation engine service (RRES) may be utilized to generate routine recommendations that target multiple devices such as "motion detected by your kitchen sensor would turn on kitchen lights" where the motion sensor and kitchen lights are different targets.

The system 104 may also generate a list of candidate customer-entity pairs, where an entity can be a device or a group, based on state prior data from a daily updater. Potential candidates for selecting the targeted entity for a given use case may include, for example—(1) an hourly on-state prior (i.e., how often a device is "on" within a time range), (2) hourly turn-on prior (i.e., how often a device is switched on within a time range), and (3) device embedding clusters (i.e., the average prior value for all devices in a cluster). The system 104 may use hourly on-state priors to generate customer-entity pairs because it had the highest estimated recall and precision.

To allow for experimentation, the system 104 may generate a data pipeline to load certain extracts in certain formats (containing candidate customer-entity pairs) into a database table. The system 104 may then extend RRES so that it may read from a new data source (i.e., the database table).

At runtime, the system 104 may look up the database table to determine if a customer is eligible and surface the recommendation with the target entity (device or group) specified in the database table. This workflow may be flexible because it may allow the system 104 to launch new recommendation use cases and set them up as A/B experiments. The system 104 can randomly assign customers who are eligible for a recommendation to a control (e.g., target an entity with a static alias such as bedroom light) or treatment (e.g., target an entity based on customer usage and scenario in the database table) group and measure the acceptance of the recommendation versus its corresponding static recommendation.

As used herein, the one or more models and/or the components responsible for determining personalized device routines to recommend may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with the prior personalized device routine recommendations and/or feedback data. The models may be trained for multiple user accounts and/or for a specific user account. As such, the machine learning models may be configured to learn, without human intervention, attributes of collected data and/or actions taken associated with device usage cessation.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices.

As shown in FIG. 1, several of the components of the system 104 and the associated functionality of those components as described herein may be performed by one or more of the devices. Additionally, or alternatively, some or all of the components and/or functionalities associated with the devices may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in system 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the system 104 may be local to an environment associated the devices. For instance, the system 104 may be located within one or more of the voice interface devices 102 and/or the smart devices. In some instances, some or all of the functionality of the system 104 may be performed by one or more of the devices. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2A:
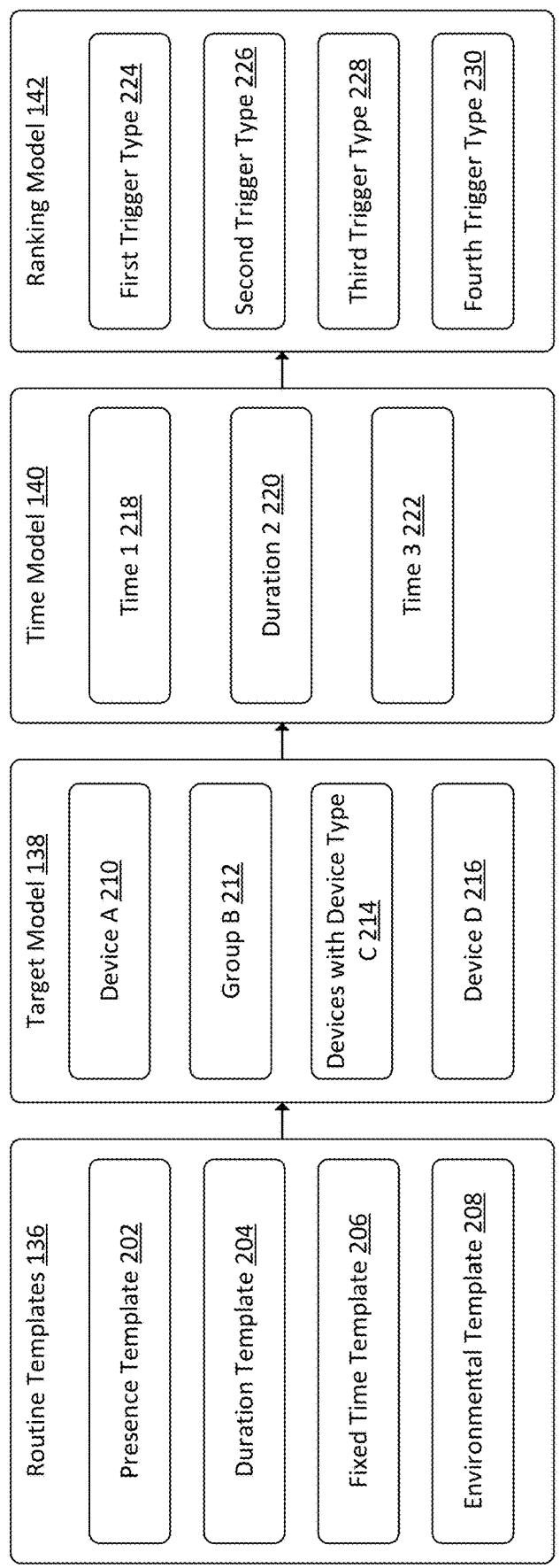
FIG. 2A illustrates a conceptual diagram of example components utilized for personalized device routines.

FIG. 2A illustrates a conceptual diagram of example components utilized for personalized device routines. The components described with respect to FIG. 2A may be the same or similar to components described with respect to FIG. 1. For example, FIG. 2A may include one or more routine templates 136, a target model 138, a time model 140, and/or a ranking model 142. The routine templates 136 may include a presence template 202, a duration template 204, a fixed time template 206, and/or an environmental template 208. Each of these templates as well as the models described with respect to FIG. 2A are described by way of example below.

When determining which of several candidate routine recommendations to surface to a user, a routine selector may be utilized. The routine selector may initially determine one or more of the routine templates 136 that are available for the smart device(s) at issue to create any number of candidate routines from these templates. Such routine templates 136 may be based at least in part on trigger event types that may be associated with a given routine. Example trigger event types include, for example, the presence template 202 indicating that an action is to be performed by a smart device when presence is detected and/or when presence of a particular user is detected. Another example trigger event type may include a duration template 204 indicating that an action is to be performed by a smart device after a certain amount of time has lapsed since a defined event has occurred. Another example trigger event type may include a fixed time template 206 indicating that an action is to be performed when a fixed time (e.g., 6:00 am, noon, etc.) occurs. Another example trigger event type may include an environmental template 208 indicating that an action is to be performed when a certain environmental condition is detected, such as when certain weather is detected, when sunrise and/or sunset occurs, when certain temperatures are detected, etc. It should be understood that these routine templates 136 are provided by way of example and not as the exclusive types of routine templates 136. For example, other routine templates 136 may be based on trigger event types such as device-linkage templates where an action may be performed by a given smart device when another device is operated, etc. It should also be understood that while device actions are described by way of example when a trigger event is detected, such as a light being turned on and/or off, the device actions may include any action that the devices are configured to take, including, again by way of example, lights turning on and off, doors locking and unlocking, thermostats changing temperature settings, televisions changing channels, volumes, etc., window treatments closing and opening, fireplaces turning on and off, fans turning on and off, garage doors opening and closing, appliances being operated, motion sensors enabling and disabling, etc.

The routine selector 126 may then utilize the target model 138 to determine which of the smart devices associated with the user account data may be associated with each candidate routine. In some examples, the target model 138 may be utilized to identify each of the individual devices associated with the user account data as well as device groups associated with the user account data. These device groups may have been previously setup by a user associated with the user account data and/or may be setup by the system 104 described herein. In examples, the target model 138 may be configured to determine whether to associate an individual device with a candidate routine even when that individual device is associated with a device group. In other examples, the target model 138 may be configured to determine whether to associate a group of devices with a candidate routine even when individual devices are not associated with a device group in the user account data. For example, the usage data may indicate that while a given device is associated with a device group, the routine to be recommended is most likely to be utilized for only the individual device at issue instead of all the devices in a device group. A specific example of this may be when several devices are associated with a kitchen device group, such as several smart lights, smart appliances, and a voice interface device. The target model 138 may determine that the routine at issue is associated with the operation of smart lights and then may determine to exclude the smart appliances and a voice interface device in the kitchen group from the recommended routine to operate the smart lights in the kitchen group. In another specific example, the usage data may indicate that two devices are operated together frequently even though those devices are not formally associated with the same device group in the user account data. In this example, the target model 138 may determine to associate the devices with each other for purposes of recommending a routine for those devices even though the devices are not part of a device group.

In the example of FIG. 2A, the target model 138 may be configured to utilize the usage data described herein to identify several target devices. Those target devices are shown in FIG. 2A by way of example as Device A 210, Group B 212, Devices with Device Type C 214, and/or Device D 216. Device A 210 may have been selected based at least in part on usage data indicating typical operation of Device A 210 at certain times of day and/or in response to certain commands or trigger events. Group B 212 may have been included based at least in part on user input causing operation of all the devices in Group B 212 at certain times of day and/or in response to certain commands or trigger events. Devices with Device Type C 214 may have been included based at least in part on the usage data indicating that while a given device was not utilized in a particular pattern, multiple devices sharing the same device type were utilized in a particular pattern indicating a routine may be desirable for future operation of those devices. It should be understood that the target model 138 may utilize the usage data in any way, not just the ways provided as illustrations herein, to determine which devices should be target devices for any number or combination of the candidate routines created from the templates.

Once the target devices are determined, the routine selector 126 may utilize a time model 140, which may be configured to determine candidate times and/or time-related triggers that may be applicable to the target device at issue for a given candidate routine. For example, the usage data for the user account may indicate that, for the target device(s) at issue, the target device(s) are operated within a certain time range during a given day, the target device(s) are operated within a certain duration of when another event occurs, the target device(s) are operated in association with given environmental conditions occurring such as sunset and/or sunrise, etc. Utilizing this information, the time model 140 may be configured to determine candidate timing indicators that may be associated with the candidate routine at issue.

In the example of FIG. 2A, the time model 140 may be configured to utilize the usage data described herein to identify timing indicators for operating devices pursuant to a recommended routine. Those timing indicators are shown in FIG. 2A by way of example as Time 1 218, Duration 2 220, and/or Time 3 222. In this example, the time model 140 may utilize the usage data to determine that operations associated with one or more of the target devices occur frequently with respect to a given time of the day (e.g., Time 1 218) and/or with respect to a given event, such as sunset and/or sunrise (e.g., Time 3 222). In other examples, the usage data may indicate that operation of at least one of the target devices occurs within a certain duration of time from another event, such as a voice command, an environmental condition, detection of presence, operation of another device, etc. (e.g., Duration 2 220). By so doing, the time model 140 may generate a list of candidate timing indicators to potential attribute to various target devices for the purpose of recommending a routine.

Additionally, the routine selector 126 may utilize a ranking model 142, which may be configured to rank the trigger event types to potentially be associated with a given routine. As described above, various trigger event types may be candidates for use in a given routine. The ranking model 142 may utilize the usage data described herein to determine which of the trigger event types may be most desirable for a given routine. For example, the usage data may indicate that a certain smart light is turned off each day at or around the same time. This usage data may indicate that a time-based trigger event type is preferable for the recommended routine. In other examples, the usage data may indicate that the smart light is turned on each day at various times that correspond to when sunset occurs. This usage data may indicate that a light-based trigger event type is preferable for the recommended routine. In still other examples, the usage data may indicate that a smart light is turned off after a certain period of time from when a voice command is provided. This usage data may indicate that a duration-based trigger event type is preferable for the recommended routine. It should be understood that these examples are illustrative and not limiting, and that other usage data and trigger event type determinations based on such usage data are included in this disclosure.

In the example of FIG. 2A, the ranking model 142 may be configured to utilize the usage data described herein to identify and/or rank trigger event types to associate with the target devices and the timing indicators. Those trigger types are shown in FIG. 2A as First Trigger Type 224, Second Trigger Type 226, Third Trigger Type 228, and/or Fourth Trigger Type 230. These trigger types are described in more detail with respect to FIG. 1, above.

FIG. 2B illustrates a table showing example trigger event types and corresponding example responses. It should be understood that the trigger event types 250 that are shown in FIG. 2B are examples and other and/or different trigger event types 250 are also included in this disclosure. Likewise, the example responses 252 shown in FIG. 2B are also examples and other and/or different responses 252 are also included in this disclosure.

As discussed elsewhere herein in more detail, multiple trigger event types 250 may be considered candidate trigger event types for use in a given routine, including in use of a candidate routine potentially to be surfaced to a user. Those trigger event types 250 highlighted in FIG. 2B include, for example, a voice-based trigger, a link-based trigger, a time-based trigger, a duration-based trigger, a light-based trigger, and/or a presence-based trigger. Examples of these trigger event types 250 are provided in FIG. 2B. For example, the voice-based trigger may be a user command that is received at one or more voice interface devices, such as a voice command stating, "I'm home." Note that in this example, the user utterance may not be in the form of a request to perform an action, such as "turn the lights" on, but instead may be a statement made to the voice interface device. The link-based trigger may be when a given device transitions device states, such as a garage door opener transitioning from a closed state to an open state. The time-based trigger may be when a certain time occurs during the day, such as when a device detects that the time is 9:00 pm. The duration-based trigger may be detection of an amount of time lapsing from when a given event, such as a device state transition, occurs. The light-based trigger may be when an environmental condition such as sunset and/or sunrise are detected. The presence-based trigger may be when one or more devices detects user presence in an environment, detects cessation of user presence, and/or detects presence of a particular user.

In instances where a given routine is established with one or more of these trigger event types 250 and the corresponding trigger events are detected, the responses 252 may be performed. The example responses 252 provided as illustration in FIG. 2B include, for example, hallway lights turning on, a fireplace turning on, and a temperature setting on a thermostat changing when the voice-based trigger occurs. Another example response 252 may include a second device transitioning device state when the link-based trigger occurs. Another example response 252 may include a smart light turning off when the time-based trigger occurs. Another example response 252 may include the fireplace turning off 30 minutes after it is turned on as associated with a duration-based trigger. Another example response 252 may include smart lights in a device group "living room lights" turning on when a light-based trigger occurs. Yet another example response 252 may include a smart television turning on when the presence-based trigger occurs. These example trigger event types 250 and corresponding responses 252 may make up the routines as established in association with a given user account.

Figure 3:
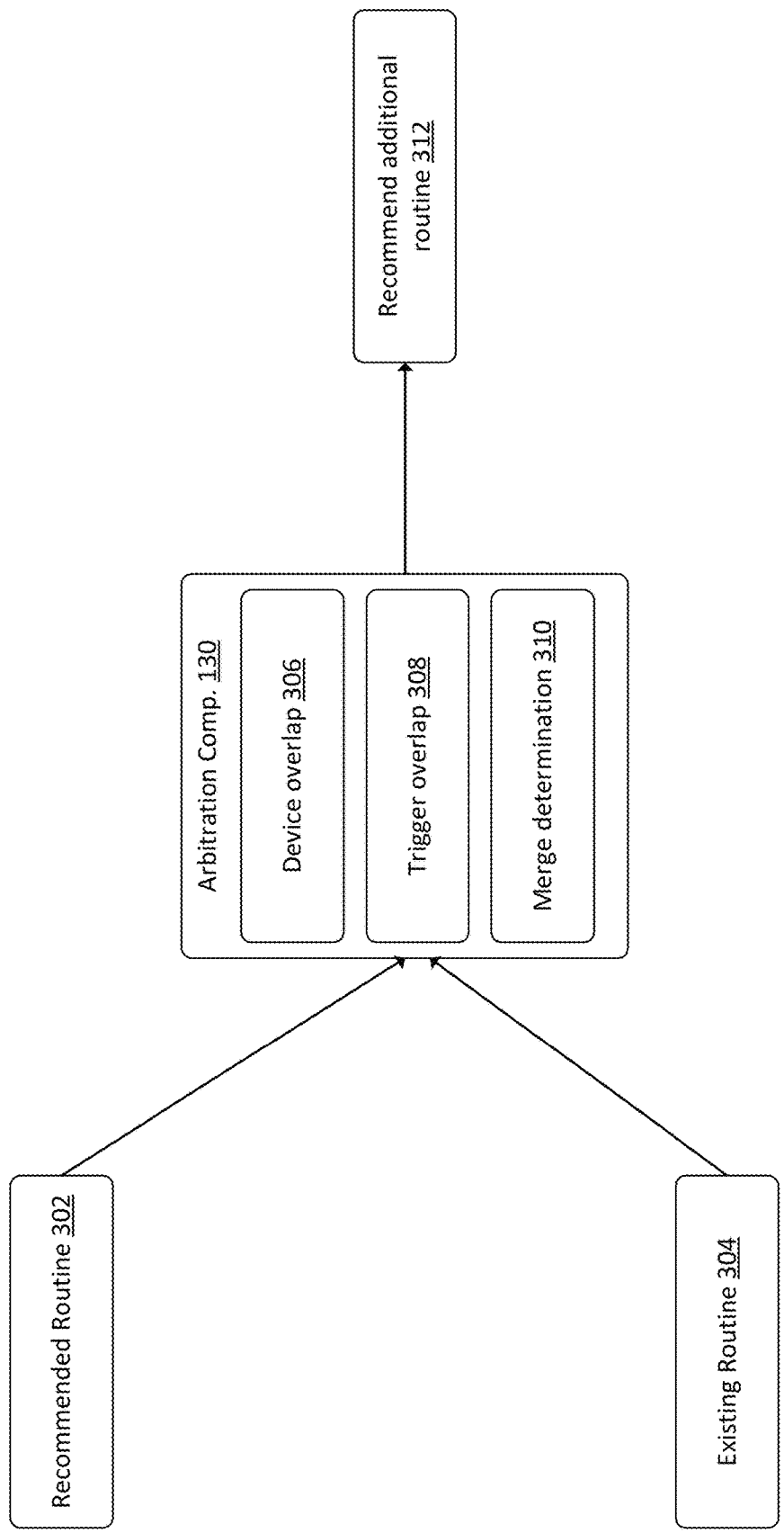
FIG. 3 illustrates a conceptual diagram of example components utilized for routine recommendation arbitration where an additional routine is recommended.

FIG. 3 illustrates a conceptual diagram of example components utilized for routine recommendation arbitration where an additional routine is recommended. FIG. 3 may have components that are the same or similar to components associated with FIG. 1. For example, FIG. 3 may include an arbitration component 130, which may perform the same or similar operations as described with respect to that component in FIG. 1.

For example, the arbitration component 130 may be utilized to arbitrate between recommended routines 302 and preexisting routines 304 associated with user account data. For example, a recommended routine 302 may be generated as described elsewhere herein. Additionally, the arbitration component 130 may determine whether one or more preexisting routines 304 are associated with given user account data. When at least one preexisting routine 304 is associated with the user account data, the arbitration component 130 may determine whether a device from the recommended routine 302 is included in the preexisting routine 304. When such device overlap 306 occurs, the arbitration component 130 may also determine whether there is trigger overlap 308 indicating an overlap between a trigger event associated with the recommended routine 302 and a trigger event associated with the preexisting routine 304. When such device overlap 306 and trigger overlap 308 occurs, the arbitration component 130 may determine an arbitration action to take such that conflicting routines are not recommended and setup for the user account.

In the example of FIG. 3, the arbitration action may be based at least in part on a merge determination 310 indicating that while device overlap 306 and the trigger overlap 308 is determined, operation of the device in question differs sufficiently between the recommended routine 302 and the preexisting routine 304, such as when the preexisting routine 304 is to turn off a smart light at sunrise and the recommended routine 302 is to turn on the same smart light at sunset. In this example, the time gap and difference in operation are evaluated by the merge determination 310 to have sufficient differentiation that combining the routines or replacing the existing routine would result in a poor user experience. This may lead to the recommended routine being recommended as an additional routine 312 to be added to the user account data. In this example of FIG. 3, the merge determination 310 may be an arbitration action that differs from other arbitration actions described in more detail with respect to FIGS. 4 and 5.

Figure 4:
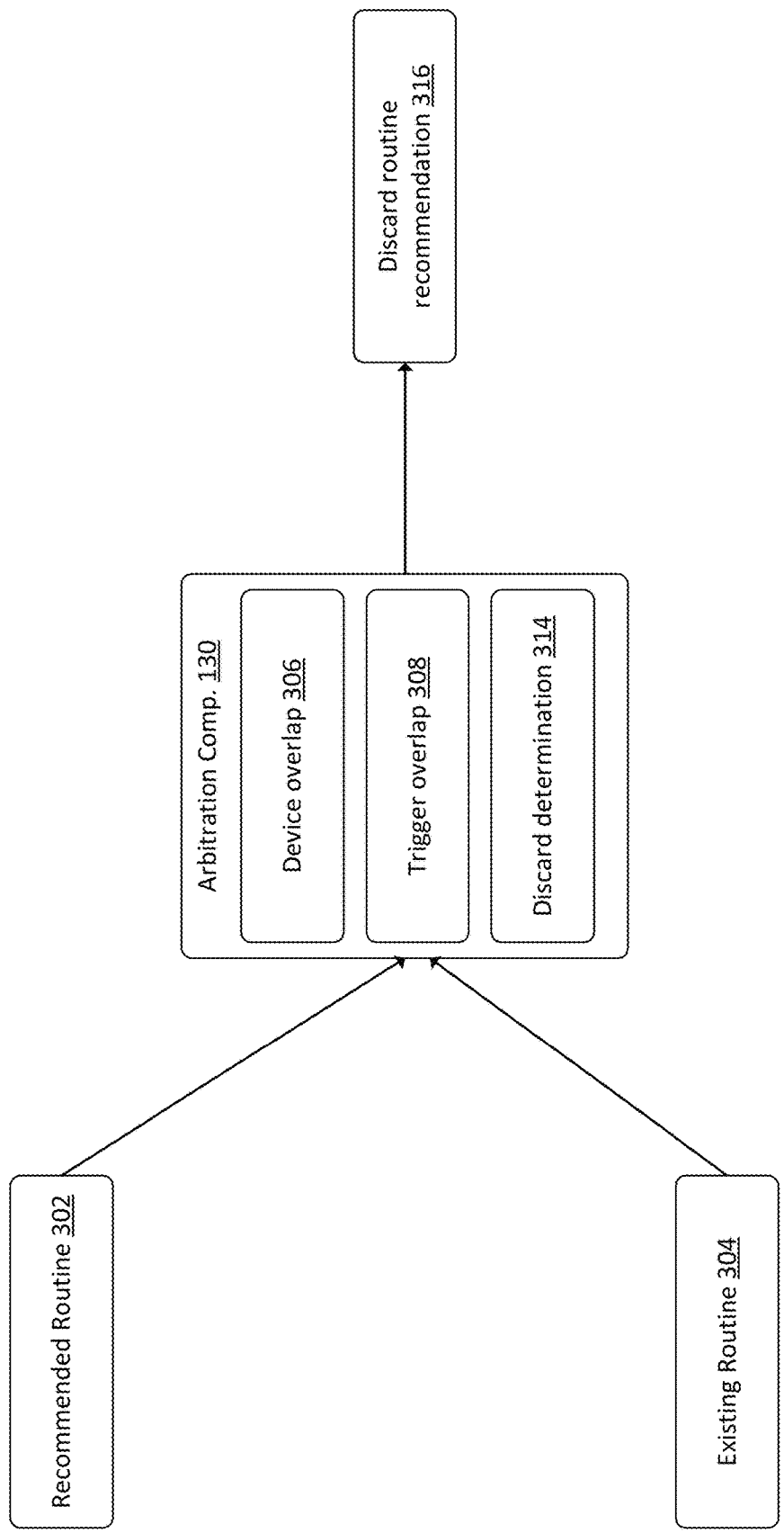
FIG. 4 illustrates another conceptual diagram of example components utilized for routine recommendation arbitration where a conflict between routines is determined.

FIG. 4 illustrates another conceptual diagram of example components utilized for routine recommendation arbitration where a conflict between routines is determined. FIG. 4 may have components that are the same or similar to components associated with FIG. 1. For example, FIG. 4 may include an arbitration component 130, which may perform the same or similar operations as described with respect to that component in FIG. 1.

For example, the arbitration component 130 may be utilized to arbitrate between recommended routines 302 and preexisting routines 304 associated with user account data. For example, a recommended routine 302 may be generated as described elsewhere herein. Additionally, the arbitration component 130 may determine whether one or more preexisting routines 304 are associated with given user account data. When at least one preexisting routine 304 is associated with the user account data, the arbitration component 130 may determine whether a device from the recommended routine 302 is included in the preexisting routine 304. When such device overlap 306 occurs, the arbitration component 130 may also determine whether there is trigger overlap 308 indicating an overlap between a trigger event associated with the recommended routine 302 and a trigger event associated with the preexisting routine 304. When such device overlap 306 and trigger overlap 308 occurs, the arbitration component 130 may determine an arbitration action to take such that conflicting routines are not recommended and setup for the user account.

In the example of FIG. 3, the arbitration action may be based at least in part on a discard determination 314 indicating that the device overlap 306 and the trigger overlap 308 results in two routines that conflict with each other. For example, the preexisting routine 304 may be for a given light device to turn on at 6:00 pm each evening, while the recommended routine 302 may be for the same light device to turn off 30 minutes after presence is detected in the environment in question, and the usage data indicates that such presence is detected frequently at or around 6:00 pm. These operations may conflict at least in some scenarios and may lead to a poor user experience. In some embodiments, determination of conflicting scenarios that cause poor user experience can be derived from aggregated past user data or similar data sources using a model or similar process. As such, the discard determination 314 may be determined and a discard routine recommendation determination 316 may be made and acted on. In this example, the recommended routine 302 may not be surfaced to the user and the conflicting circumstances may be utilized to assist in formulating subsequent routine recommendations.

Figure 5:
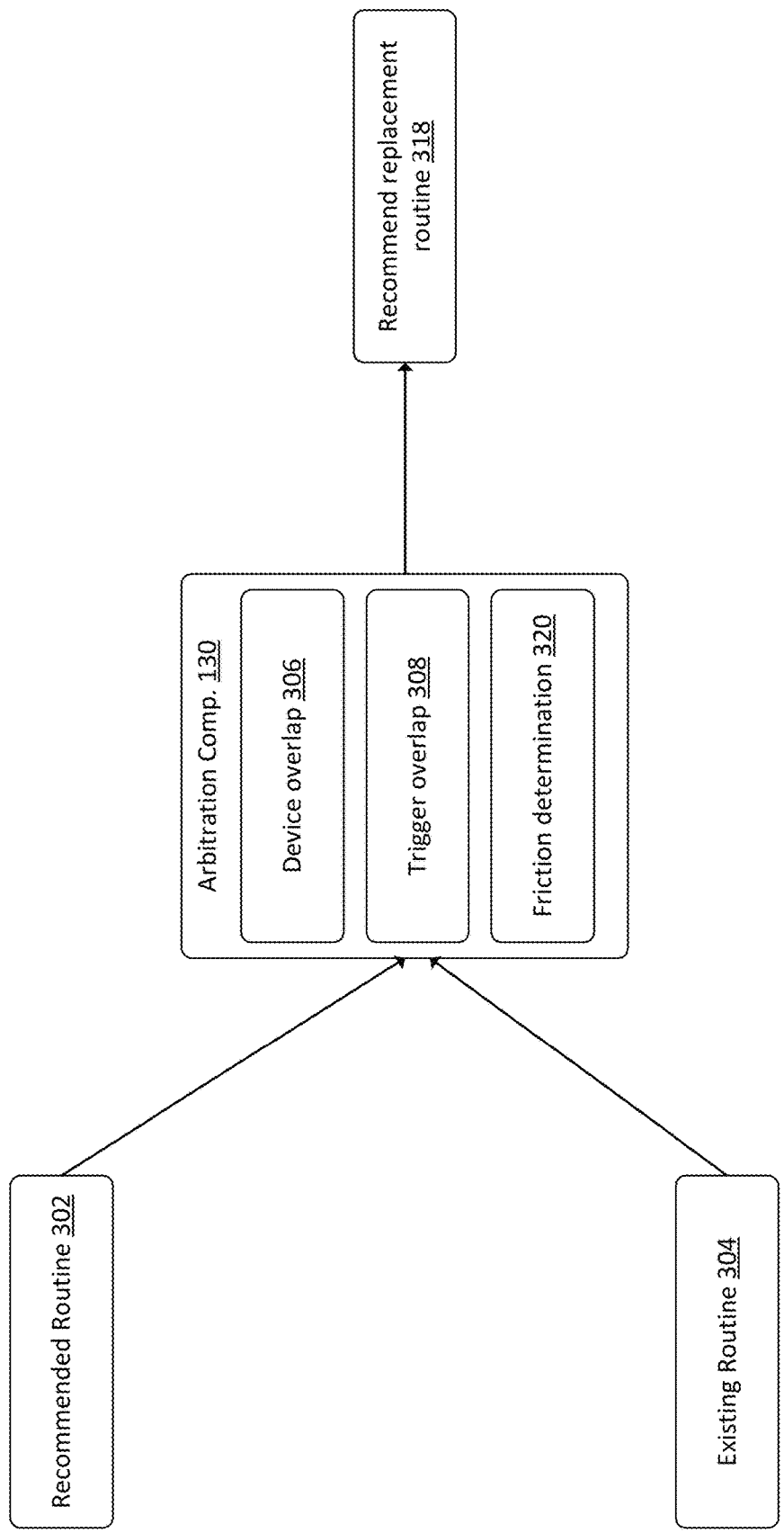
FIG. 5 illustrates another conceptual diagram of example components utilized for routine recommendation arbitration where recommendation merging is performed.

FIG. 5 illustrates another conceptual diagram of example components utilized for routine recommendation arbitration where recommendation merging is performed. FIG. 5 may have components that are the same or similar to components associated with FIG. 1. For example, FIG. 5 may include an arbitration component 130, which may perform the same or similar operations as described with respect to that component in FIG. 1.

For example, the arbitration component 130 may be utilized to arbitrate between recommended routines 302 and preexisting routines 304 associated with user account data. For example, a recommended routine 302 may be generated as described elsewhere herein. Additionally, the arbitration component 130 may determine whether one or more preexisting routines 304 are associated with given user account data. When at least one preexisting routine 304 is associated with the user account data, the arbitration component 130 may determine whether a device from the recommended routine 302 is included in the preexisting routine 304. When such device overlap 306 occurs, the arbitration component 130 may also determine whether there is trigger overlap 308 indicating an overlap between a trigger event associated with the recommended routine 302 and a trigger event associated with the preexisting routine 304. When such device overlap 306 and trigger overlap 308 occurs, the arbitration component 130 may determine an arbitration action to take such that conflicting routines are not recommended and setup for the user account.

In the example of FIG. 5, the arbitration action may be based at least in part on a merge determination 310 indicating that while device overlap 306 and the trigger overlap 308 is determined, operation of the device in question differs as between the recommended routine 302 and the preexisting routine 304, such as when the preexisting routine 304 is to turn off a smart light at sunrise and the recommended routine 302 is to turn on the same smart light at sunset. This may lead to the recommended routine being recommended as a replacement routine 318 to be added to the user account data where the recommended routine combines at least some of the actions, triggers, and devices of the existing routine with the recommended routine. In this example, the arbitration action may include determining to replace the preexisting routine 304 with the recommended routine 302 in a way that appears to update the preexisting routine 304 for the user. An example of this may be when a preexisting routine 304 is to cause a given device to perform a given action when a trigger event is detected and when the recommended routine 302 is to cause that device and another device to perform the given action. In this example, the recommendation may be to replace to preexisting routine 304 with the more inclusive recommended routine 302. When the friction determination 320 is made as described herein, it should be understood that one or more models may be trained to make the friction determination 320, and such models may be utilized to determine whether to replace the preexisting routine 304 with the recommended routine 302 or whether to suggest that the preexisting routine 304 be maintained while the recommended routine 302 be discarded.

Figure 6A:
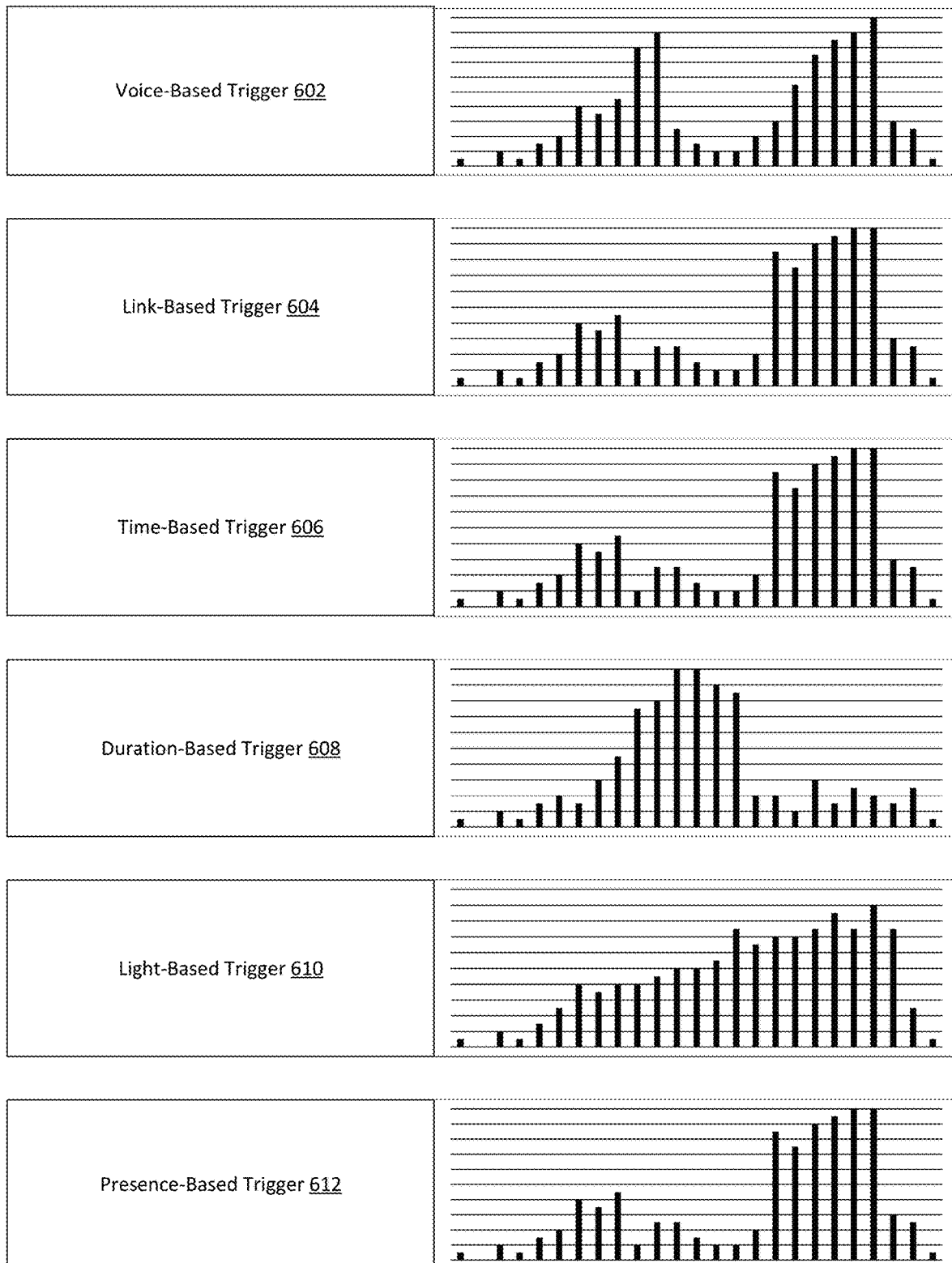
FIG. 6A illustrates a conceptual diagram of example data utilized to determine a trigger event type to associate with a routine recommendation.

FIG. 6A illustrates a conceptual diagram of example data utilized to determine a trigger event type to associate with a routine recommendation. The data shown in FIG. 6A indicates how usage data may be parsed, ranked, and utilized for determining a trigger event type to associated with a routine recommendation.

For example, FIG. 6A illustrates several different types of trigger events that are utilized to operate one or more smart devices associated with user account data. Those trigger event types may include, for example, a voice-based trigger 602, a link-based trigger 604, a time-based trigger 606, a duration-based trigger 608, a light-based trigger 610, and/or a presence-based trigger 612. It should be understood that while these trigger event types have been provided by way of illustration in FIG. 6A, any other number or types of trigger events may be utilized to operate smart devices that those trigger types may be tracked and utilized as described herein. With respect to the illustrated trigger event types 602-612, the voice-based trigger 602 may be associated with performance of an operation in association with a smart device in response to a voice command. The link-based trigger 604 may be associated with performance of an operation in association with a smart device in response to another device performing an operation. The time-based trigger 606 may be associated with performance of an operation in association with a smart device in response to a certain time occurring in a day and/or in a given day of the week. The duration-based trigger 608 may be associated with performance of an operation in association with a smart device in response to a certain duration of time passing from a given event to when the operation occurs. The light-based trigger 610 may be associated with performance of an operation in association with a smart device in response to an environmental condition such as an ambient light value satisfying a threshold, such as in situations where sunset and/or sunrise occurs. The presence-based trigger 612 may be associated with performance of an operation in association with a smart device in response to detection of presence and/or detection of a particular user in a given environment.

The graphs adjacent to the trigger event types 602-612 indicate how frequently certain trigger events are utilized to operate smart devices with respect to devices associated with given user account data. The y-axis of these graphs illustrates counts of the specific types of trigger events, with the x-axis indicating a time period during which tracking of the trigger events occurred.

In the example of FIG. 6A, note that voice-based triggers 602, link-based triggers 604, light-based triggers 610, and presence-based triggers 612 occur prominently during a latter portion of the defined time period, which during that same span duration-based triggers 608 are not prominent. But during a difference period of time during the span the duration-based triggers 608 are prominent while the other triggers are not prominent. This data may be utilized to determine which trigger event type may be most desirable for a routine recommendation for a given smart device and a given time period when the routine is to be initiated. For example, the duration-based trigger 608 may be selected if the smart device at issue is determined to be associated with a routine during the period of time when such a trigger is prominent. In other examples associated with devices to be operated pursuant to a routine at different times, other trigger event types such as the link-based trigger 604 and/or the light-based trigger 610 may be more preferable than the duration-based trigger 608.

Figure 6B:
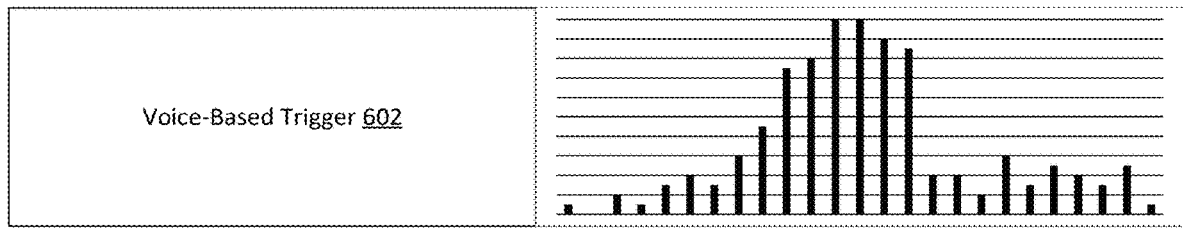
FIG. 6B illustrates a conceptual diagram of other example data utilized to determine a different trigger event type to associate with a routine recommendation.
Figure 6B:
Figure 6B:
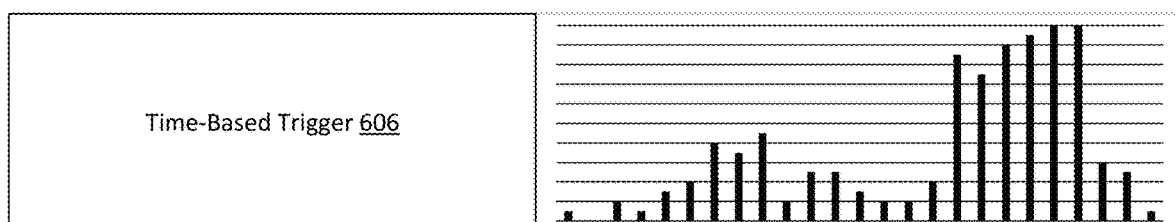
Figure 6B:
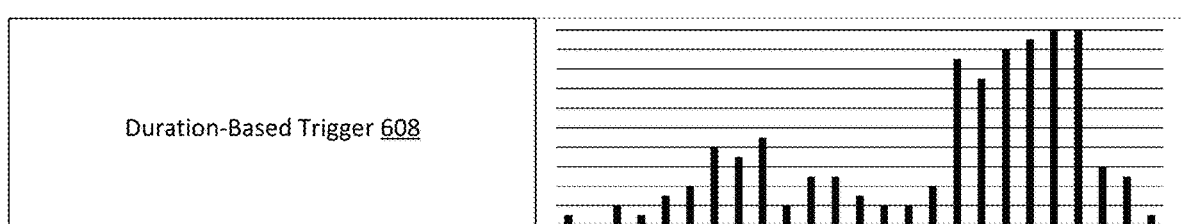
Figure 6B:
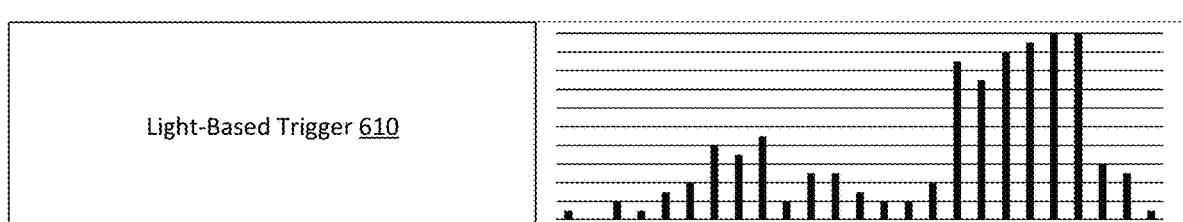
Figure 6B:
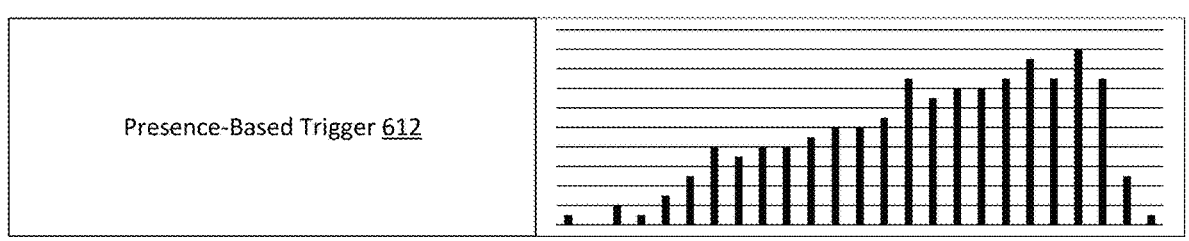

FIG. 6B illustrates a conceptual diagram of other example data utilized to determine a different trigger event type to associate with a routine recommendation. The data shown in FIG. 6B indicates how usage data may be parsed, ranked, and utilized for determining a trigger event type to associated with a routine recommendation.

For example, FIG. 6B illustrates several different types of trigger events that are utilized to operate one or more smart devices associated with user account data. Those trigger event types may include, for example, a voice-based trigger 602, a link-based trigger 604, a time-based trigger 606, a duration-based trigger 608, a light-based trigger 610, and/or a presence-based trigger 612. It should be understood that while these trigger event types have been provided by way of illustration in FIG. 6B, any other number or types of trigger events may be utilized to operate smart devices that those trigger types may be tracked and utilized as described herein. With respect to the illustrated trigger event types 602-612, the voice-based trigger 602 may be associated with performance of an operation in association with a smart device in response to a voice command. The link-based trigger 604 may be associated with performance of an operation in association with a smart device in response to another device performing an operation. The time-based trigger 606 may be associated with performance of an operation in association with a smart device in response to a certain time occurring in a day and/or in a given day of the week. The duration-based trigger 608 may be associated with performance of an operation in association with a smart device in response to a certain duration of time passing from a given event to when the operation occurs. The light-based trigger 610 may be associated with performance of an operation in association with a smart device in response to an environmental condition such as an ambient light value satisfying a threshold, such as in situations where sunset and/or sunrise occurs. The presence-based trigger 612 may be associated with performance of an operation in association with a smart device in response to detection of presence and/or detection of a particular user in a given environment.

The graphs adjacent to the trigger event types 602-612 indicate how frequently certain trigger events are utilized to operate smart devices with respect to devices associated with given user account data. The y-axis of these graphs illustrates counts of the specific types of trigger events, with the x-axis indicating a time period during which tracking of the trigger events occurred.

In the example of FIG. 6B, note that time-based triggers 606, duration-based triggers 608, light-based triggers 610, and presence-based triggers 612 occur prominently during a latter portion of the defined time period, which during that same span voice-based triggers 602 and link-based triggers 604 are not prominent. But during a difference period of time during the span the voice-based triggers 602 and the link-based triggers 604 are prominent while the other triggers are not prominent. This data may be utilized to determine which trigger event type may be most desirable for a routine recommendation for a given smart device and a given time period when the routine is to be initiated. For example, the voice-based trigger 602 and/or the link-based trigger 604 may be selected if the smart device at issue is determined to be associated with a routine during the period of time when such a trigger is prominent. In other examples associated with devices to be operated pursuant to a routine at different times, other trigger event types such as the duration-based trigger 608 may be more preferable.

Figure 7:
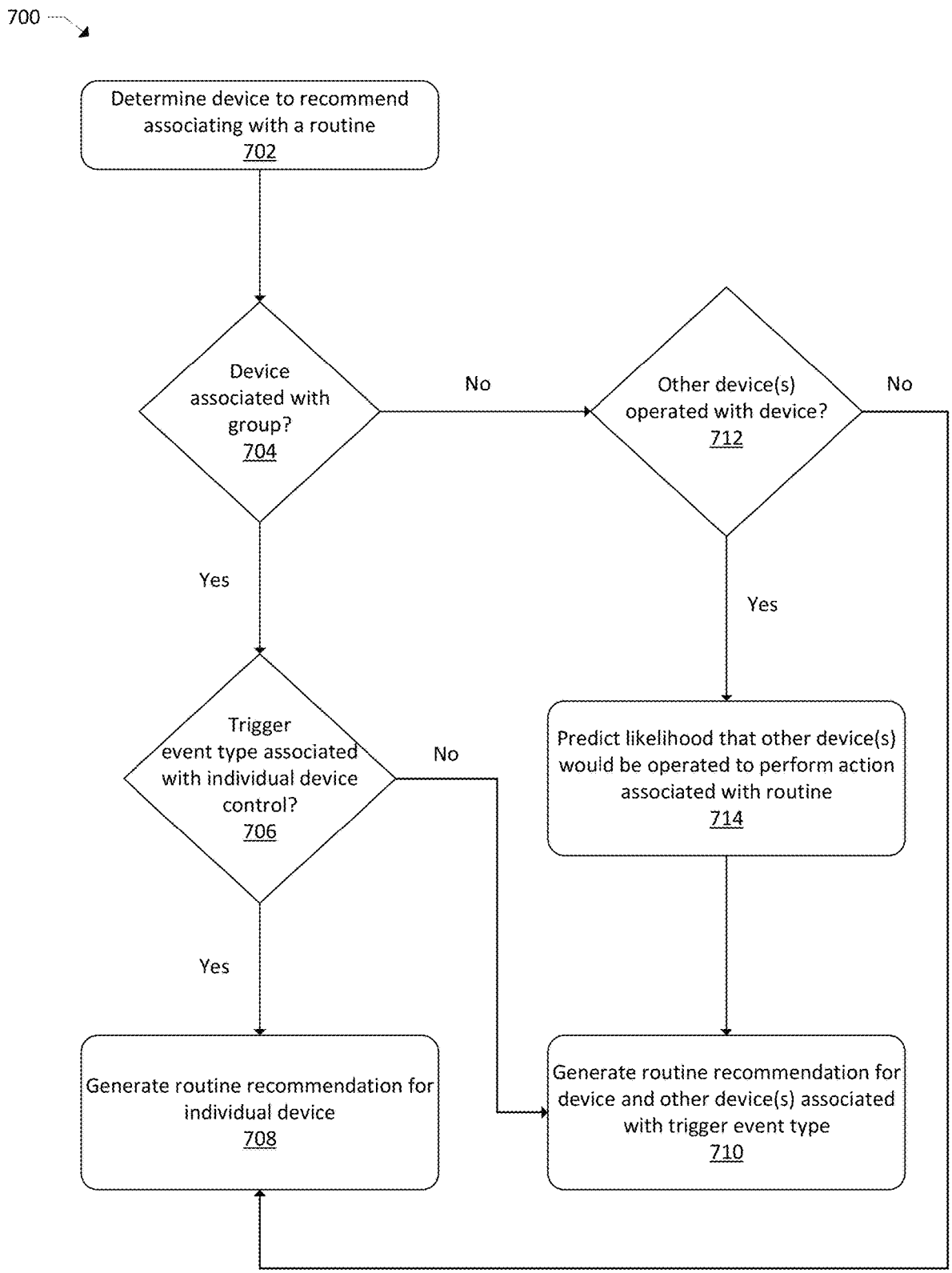
FIG. 7 illustrates a flow diagram of an example process for determining whether to recommend a routine be performed with respect to a group of devices and/or to an individual device.

FIG. 7 illustrates processes for personalized device routines. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 8-16, although the processes may be implemented in a wide variety of other environments, architectures and systems.

FIG. 7 illustrates a flow diagram of an example process 700 for determining whether to recommend a routine be performed with respect to a group of devices and/or to an individual device. The order in which the operations or steps are described is not intended to be construed as a limitation, and any number of the described operations may be combined in any order and/or in parallel to implement process 700.

At step 702, the process 700 may include determining a device to recommend associating with a routine. For example, as noted in more detail with respect to FIG. 1, a target model may be utilized by a routine selector component to determine one or more smart devices that may be associated with a routine to be recommended to a user. The device may be any smart device as described herein.

At block 704, the process 700 may include determining whether the device is associated with a device group. For example, user account data may be queried to determine if a device identifier of the device in question is associated with a device group and/or an identifier of a device group as maintained by the system described herein and/or another system associated with the smart device.

In examples where the device is associated with a device group, the process 700 may include, at block 706, determining whether a trigger event type is associated with individual device control or whether the trigger event type is associated with device control of all the devices in the device group. For example, certain trigger event types may be associated with the operation of certain smart devices while other trigger event types may not be suitable for other smart device types. For example, smart lights may be particularly relevant to environmental-based trigger events such as when sunset and/or sunrise is determined, while other smart devices such as televisions may not be as relevant to such trigger event types. In these any other examples, the system may determine whether devices in a given device group are of a device type that is relevant to a trigger event type for the routine in question or whether such smart devices would not typically be operated utilizing the trigger event type at issue.

In examples where the trigger event type is associated with individual device control, the process 700 may include, at block 708, generating a routine recommendation for the individual device. In this example, the system may determine that even though the smart device at issue is associated with a device group, it would be preferable for the recommended routine to be for just the individual device to perform an operation instead of all the devices in the device group when a given trigger event is detected. By doing so, if the routine recommendation is accepted, the user may experience smart device operation that is desirable given the trigger event type and may not have other devices be operated when not desired.

In examples where the trigger event type is associated with device control of all the devices in the device group, the process 700 may include, at block 710, generating a routine recommendation for the device, the other device(s) in the device group, and/or additional devices in other groups or separate from other groups. This can include creating or merging groups. In this example, even in situations where the target model described herein does not identify the device group as a target group for the routine, inclusion of the device in question in the device group along with the trigger event type being relevant to the other devices in the device group may result in a recommended routine to operate all or a portion of the devices in the group pursuant to the routine instead of just the individual device at issue.

Returning to block 704, in examples where the device is not associated with a device group, the process 700 may include, at block 712, determining whether other device(s) are operated with the device in question even though the device is not associated with a device group. For example, the device may not be associated with a device group, but the usage data described herein may indicate that the smart device is operated near in time from when one or more other smart devices are operated. For example, a user may provide a voice command of "turn on bedroom light" and then follow that command with another voice command to "close bedroom blinds." Even if the bedroom light and the bedroom blinds are not in the same device group, usage of these devices at or near the same time frequently may result in a determination that the devices should be associated for purposes of a routine even if a device group is not created for those devices.

In examples where one or more other devices are operated with the device in question, the process 700 may include, at block 714, predicting a likelihood that the other device(s) would be operated to perform an action associated with the routine in question. In these examples, the process 700 may proceed to block 710 where the recommended routine may be for the device in question and the one or more other devices predicted to be operated in association with the routine. This can include creating a group or adding a device to a group. Using the example above, the trigger event type may be a light-based trigger event where detection of sunset may be the trigger for a smart light to turn on. In this example, the same trigger event type may be utilized and may be relevant for closing blinds in the same environment as the smart light. In other examples, turning a television on, for example, may not be particularly relevant for the light-based trigger event type.

It should be understood that when multiple devices are included in a recommended routine as described herein, those devices may be associated with each other as device pairs. In addition to the above, the recommended routines may be to perform one or more actions across multiple device groups. In this example, the recommended routine may be associated with group device identifiers and not just device identifiers. In these and other examples, a trigger event and the device(s) and/or group(s) may be paired such that when the trigger event occurs, the device(s) and/or group(s) perform the action associated with the routine.

Returning to block 712, in examples where one or more other devices are not operated with the device in question, the process 700 may continue to block 708, where the recommended routine may be for the device individually to be associated with the recommended routine.

Figure 8:
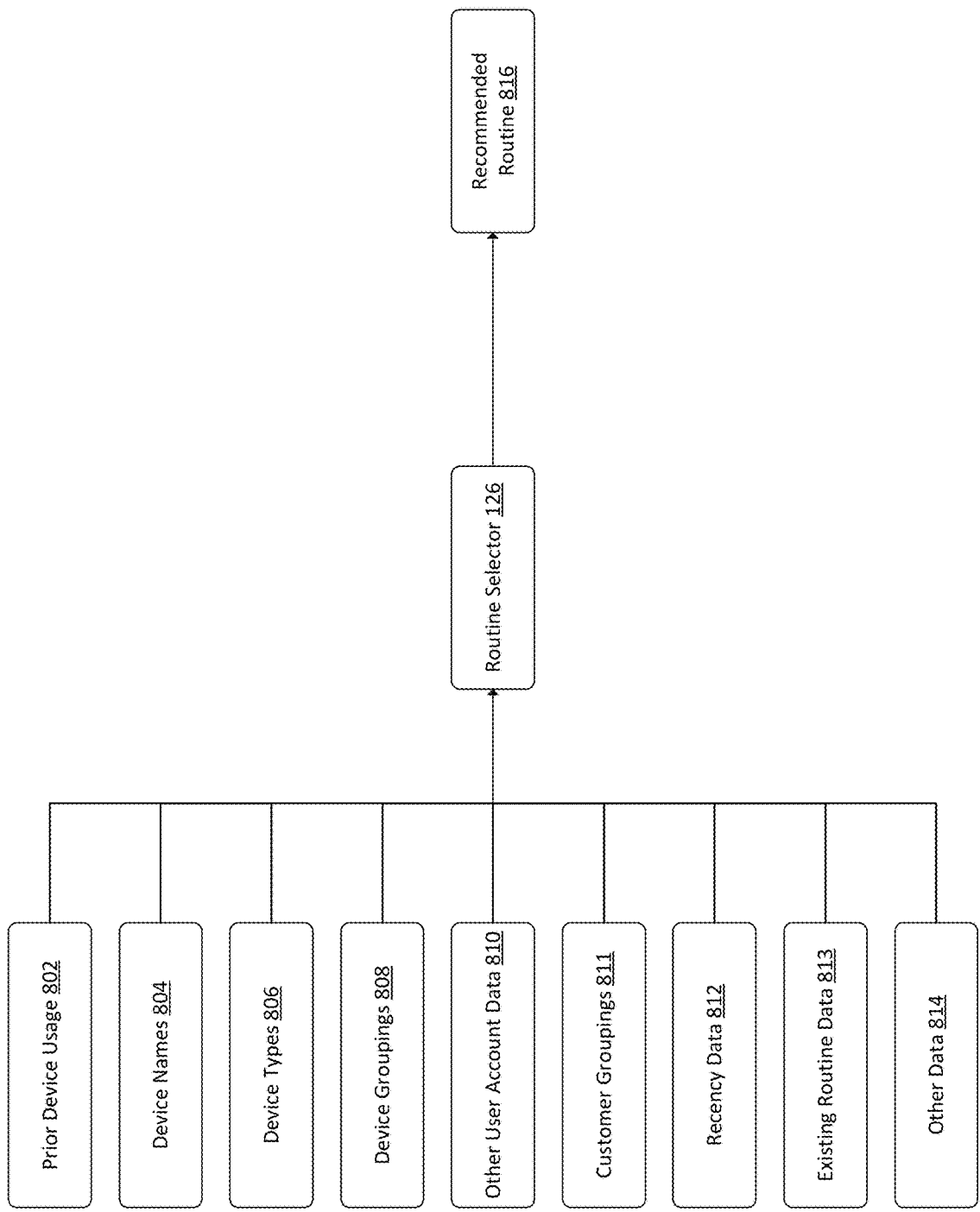
FIG. 8 illustrates a conceptual diagram of example data utilized by a routine selector to select a routine to be recommended.

FIG. 8 illustrates a conceptual diagram of example data utilized by a routine selector to select a routine to be recommended. FIG. 8 may include the same or similar components as described with respect to FIG. 1. For example, FIG. 8 may include a routine selector 126.

As shown in FIG. 8, one or more input types may be utilized by the routine selector 126 to determine a routine to recommend to a user. Example input types may include, as illustrated in FIG. 8, a prior device usage 802, device names 804, device types 806, device groupings 808, other user account data 810, customer groupings 811, recency data 812, existing routine data 813, and/or other data 814. The prior device usage 802 may be the usage data described throughout this disclosure including how devices are utilized, when devices are utilized, a user profiles associated with usage of devices, and/or what events caused operation of the devices. The device names 804 may be the names provided to devices by one or more users, the system described herein, and/or a system associated with the smart devices themselves. The device types 806 may indicate the functionality that the smart devices can perform (e.g., lights on/off, doors locked/unlocked, etc.) as well as the potential states of the devices applicable for the device types. The device groupings 808 may indicate device groups to which individual smart devices are associated as well as whether given device groups are associated with other device groups. The other user account data 810 may include some or all of the data associated with the user account at issue but for other user accounts. The customer groupings 811 may include indicators of customer types with relation to how technology savvy given customers are. By way of example, some customers may have not yet interacted with a voice interface device and/or a smart device, while other customers may have extensive knowledge of voice interface devices and/or smart device and/or may have engaged in complex interactions with such devices. Still other customers may have an intermediate knowledge or ability with respect to voice interface devices and/or smart devices. The recency data 812 may indicate recent trends in device usage as well as how recently various devices were associated with a given user account and the functionalities of those recently-added device. With respect to the existing routine data 813, the user account data at issue may indicate whether one or more preexisting routines are enabled as described in more detail with respect to FIGS. 3-5. The other data 814 may include any other data made available and/or generated by the system described herein that may be utilized for personalizing device routines. This other data 814 may include, for example, data generated by one or more trained machine learning models configured to determine attributes of device usage and other data that is relevant to personalizing device routines.

The routine selector 126 may utilize some or all of these data types to inform determinations made by target models, time models, and/or ranking models associated with the process for personalizing routine recommendations. The output of the routine selector 126 may be a recommended routine 816, which may be surfaced to a user as described herein. It should be understood that once a recommended routine 816 is determined, some or all of the processes from FIGS. 3-5 may be performed to arbitrate between the recommended routine 816 and one or more preexisting routines to determine if the recommended routine 816 should be surfaced to the user or not. In examples where the selected recommended routine 816 is determined to be discarded utilizing the arbitration processes described in FIGS. 3-5, the routine selector 126 may attempt to utilize the next highest ranked recommended routine 816 to potentially surface to the user. Arbitration processes may be performed in a similar manner as described above until a recommended routine 816 is identified that does not conflict with a preexisting routine and/or until a level of confidence associated with a recommended routine 816 does not satisfy a threshold confidence, in which case the process may end without sending a routine recommendation.

Figure 9:
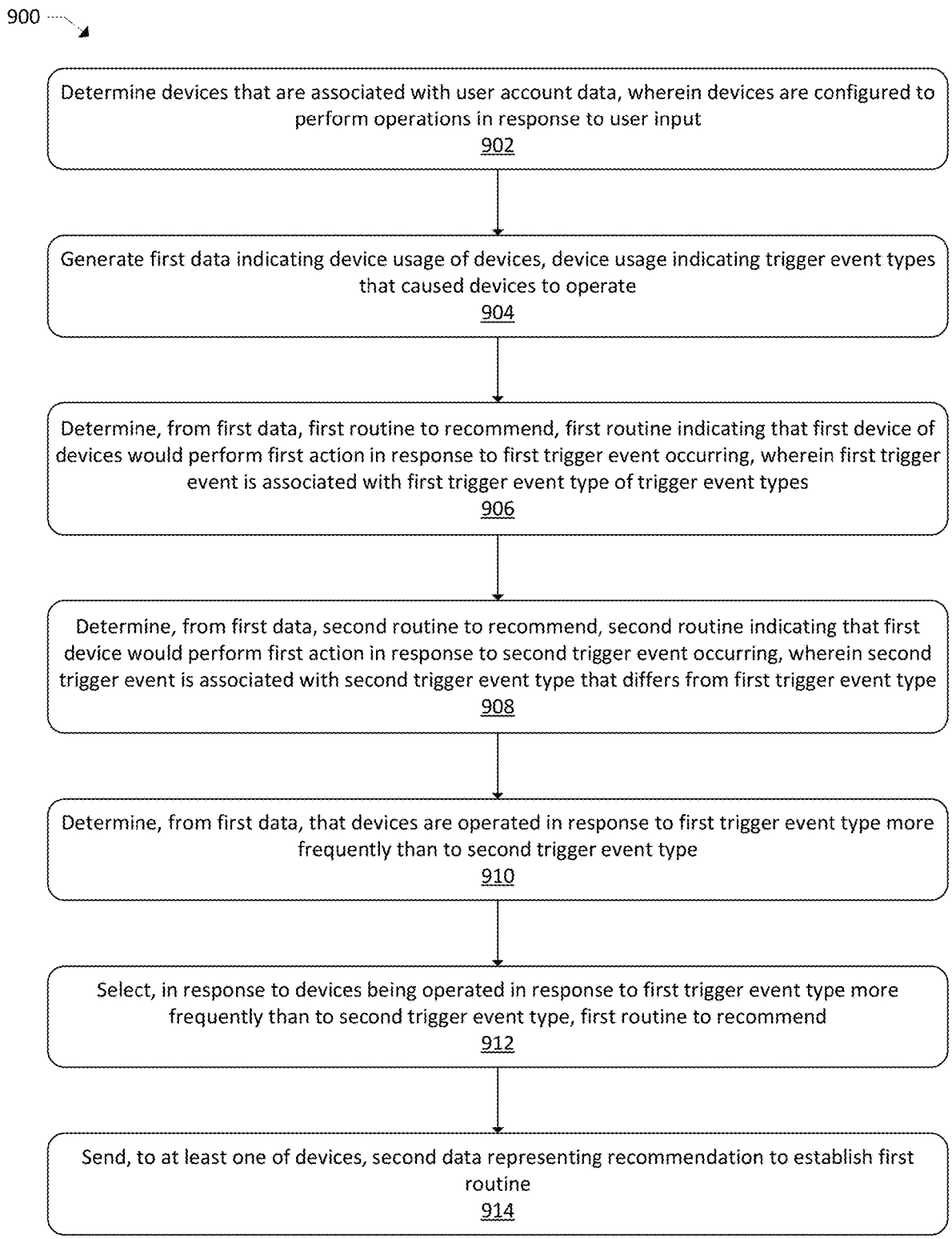
FIG. 9 illustrates a flow diagram of an example process for personalized device routines.
Figure 10:
FIG. 10 illustrates a flow diagram of another example process for personalized device routines.

FIGS. 9 and 10 illustrate processes for personalized device routines. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-8 and 11-16, although the processes may be implemented in a wide variety of other environments, architectures and systems.

FIG. 9 illustrates a flow diagram of an example process 900 for personalized device routines. The order in which the operations or steps are described is not intended to be construed as a limitation, and any number of the described operations may be combined in any order and/or in parallel to implement process 900.

At step 902, the process 900 may include determining devices that are associated with user account data, wherein the devices are configured to perform operations in response to user input. For example, user account data may be stored and may indicate device identifiers of devices that have been associated with the user account data. The device identifiers may be for smart devices that are configured to be operated by a user, including through the use of voice commands provided to a voice interface device. The user account data may store additional data associated with the devices, including device types and capabilities of the devices.

At block 904, the process 900 may include generating first data indicating device usage of the devices, the device usage indicating trigger event types associated with device operation. For example, usage data indicating what devices were operated, when those devices were operated, how those devices were operated, relationships between devices, routines that have been setup by users, and in some examples which user profiles were utilized to operate certain devices may be generated and stored in a user registry associated with the user account data. In some examples, the first data can be augmented with aggregated device usage data from other user with similar devices associated with their respective user accounts such that the aggregated data can be informative of common usage patterns of such devices.

At block 906, the process 900 may include determining, from the first data indicating historical usage of the trigger event types in association with a first device of the devices, a first routine to recommend, the first routine indicating that the first device is to perform a first action in response to a first trigger event occurring, wherein the first trigger event is associated with a first trigger event type of the trigger event types. For example, a routine selector may utilize one or more routine templates, a target model, a time model, and/or a ranking model to determine candidate routines to potentially recommend to a user. The target model, the time model, and/or the ranking model may utilize at least the usage data described herein to identify the candidate routines.

At block 908, the process 900 may include determining, from the first data indicating the historical usage of the trigger event types in association with the first device, a second routine to recommend, the second routine indicating that the first device is to perform the first action in response to a second trigger event occurring, wherein the second trigger event is associated with a second trigger event type that differs from the first trigger event type. Determining the second routine may be performed in the same or a similar manner as determining the first routine, except that the second routine may be associated with a different trigger event type than the first routine. The trigger event types may be any of the trigger event types described herein, including a presence-based trigger, a duration-based trigger, a fixed time trigger, an environmental trigger, etc. This example compares two candidate routines for selection, however, any number of candidate routines can be generated before selection.

At block 910, the process 900 may include determining, from the first data, that the devices are operated in response to the first trigger event type more frequently than to the second trigger event type. For example, this process may include utilizing the usage data known about the devices at issue and/or usage data of other user accounts with similar devices to determine which of the candidate routines is most likely to be accepted and utilized for the user account at issue. By so doing, recommendations of routines may be personalized to the user account at issue.

At block 912, the process 900 may include selecting the first routine to recommend based on the first routing having the first trigger event type, which is more frequently used with the first device than the second trigger event type. Selection based on trigger event type frequency is provided by way of example. Selection of the first routine may also be based at least in part on the usage data, device names, device types, device groupings, other user account data, recency data, and/or other data known to the system described herein as well as any combination of these features. Additional details on the use of such data to perform routine selection is provided at FIGS. 1 and 8.

At block 914, the process 900 may include sending, to at least one of the devices, second data representing a recommendation to establish the first routine. For example, a recommendation component may be configured to receive data representing the selected device routine recommendation(s) from the routine selector and may be configured to generate a recommendation to implement the selected routine(s). The recommendation may take various forms, such as data configured to be presented on an application residing on a user's personal device, audio data configured to be utilized to output audio representing the recommendation, image data configured to be utilized to output images that include the recommendation, etc. The data representing the recommendation may be sent to one or more devices associated with the user account data, and those recommendations may be interacted with by a user to accept or reject the recommendations. For example, when the recommendations are displayed on a user device, the recommendations may be configured as an interactive link that, when selected, causes user input data to be generated that indicates acceptance of the recommendation. This user input data may be sent to the routine generator, which may implement the recommended routine as described herein. When user interaction (or lack thereof) indicates rejection of the recommendation, data indicating this rejection may be generated and sent to the routine selector, which may utilize such data as a negative dataset for at least one of the target model, the time model, and/or the ranking model when subsequent routine recommendations are generated.

Additionally, or alternatively, the process 900 may include determining, from the user account data, that the first device is associated with a device group that may include a second device. The process 900 may also include determining, from the first data, that the first trigger event type is associated with control of the first device and the second device individually instead of control of the first device and the second device at a same time. The process 900 may also include determining the first routine to be established in association with the first device instead of the device group in response to the first trigger event type being associated with control of the first device and the second device individually. In these examples, the second data may represent the recommendation to establish the first routine in association with the first device.

Additionally, or alternatively, the process 900 may include determining that a preexisting routine associated with the user account data is associated with the first trigger event. The process 900 may also include determining that the preexisting routine is associated with a second device instead of the first device. The process 900 may also include determining, from the user account data, that the first device is associated with the second device. The process 900 may also include determining, in response to the preexisting routine being associated with the first trigger event and the first device being associated with the second device, the second data to include the recommendation to further establish the first routine to operate on both the first device and the second device upon occurrence of the first trigger event.

Additionally, or alternatively, the process 900 may include determining that a preexisting routine associated with the user account data is associated with the first device. The process 900 may also include determining that the preexisting routine is associated with a third trigger event type. The process 900 may also include determining that the second routine conflicts with the preexisting routine. In these examples, selecting the first routine instead of the second routine may be in response to the second routine conflicting with the preexisting routine.

FIG. 10 illustrates a flow diagram of another example process 1000 for personalized device routines. The order in which the operations or steps are described is not intended to be construed as a limitation, and any number of the described operations may be combined in any order and/or in parallel to implement process 1000.

At step 1002, the process 1000 may include determining a first device that is associated with user account data. For example, user account data may be stored and may indicate device identifiers of devices that have been associated with the user account data. The device identifiers may be for smart devices that are configured to be operated by a user, including through the use of voice commands provided to a voice interface device. The user account data may store additional data associated with the devices, including device types and capabilities of the devices.

At block 1004, the process 1000 may include generating first data indicating device usage of the first device. For example, usage data indicating what devices were operated, when those devices were operated, how those devices were operated, relationships between devices, routines that have been setup by users, and in some examples which user profiles were utilized to operate certain devices may be generated and stored in a user registry associated with the user account data. In some examples, the first data can be augmented with aggregated device usage data from other user with similar devices associated with their respective user accounts such that the aggregated data can be informative of common usage patterns of such devices.

At block 1006, the process 1000 may include determining, based at least in part on the first data, a first trigger event type to recommend for a first routine, the first trigger event type determined based at least in part on the first data indicating how at least the first device is operated in association with the first trigger event type. For example, a routine selector may utilize one or more routine templates, a target model, a time model, and/or a ranking model to determine candidate routines to potentially recommend to a user. The target model, the time model, and/or the ranking model may utilize at least the usage data described herein to identify the candidate routines. This example compares two candidate routines for selection, however, any number of candidate routines can be generated before selection. It should be understood that in some embodiments multiple candidate routines may be generated and ranked as described herein. In other examples, a single candidate routine may be generated with multiple candidate trigger event types.

At block 1008, the process 1000 may include determining, based at least in part on the first data, a second trigger event type to recommended for the first routine, the second trigger event type determined based at least in part on the first data indicating how at least the first device is operated in association with the second trigger event type. Determining the second routine may be performed in the same or a similar manner as determining the first routine, except that the second routine may be associated with a different trigger event type than the first routine. The trigger event types may be any of the trigger event types described herein, including a presence-based trigger, a duration-based trigger, a fixed time trigger, an environmental trigger, etc.

At block 1010, the process 1000 may include selecting, based at least in part on the first data, the first trigger event type to associate with the first routine. For example, this process may include utilizing the usage data known about the devices at issue and/or usage data of other user accounts with similar devices to determine which of the candidate routines is most likely to be accepted and utilized for the user account at issue. By so doing, recommendations of routines may be personalized to the user account at issue.

At block 1012, the process 1000 may include sending second data representing a recommendation to establish the first routine associated with the first trigger event type. Selection of the first routine may be based at least in part on the usage data, device names, device types, device groupings, other user account data, recency data, and/or other data known to the system described herein. Additional details on the use of such data to perform routine selection is provided at FIGS. 1 and 8.

Additionally, or alternatively, the process 1000 may include determining that the first device is associated with a device group that may include a second device. The process 1000 may also include determining third data indicating that the first trigger event type is associated with individual control of the first device and the second device. The process 1000 may also include determining to recommend the first routine to be established in association with the first device instead of the device group based at least in part on the third data. In these examples, the recommendation may establish the first routine in association with the first device.

Additionally, or alternatively, the process 1000 may include determining that a preexisting routine associated with the user account data is associated with the first trigger event type. The process 1000 may also include determining that the preexisting routine is associated with a second device. The process 1000 may also include determining, based at least in part on the preexisting routine being associated with the first trigger event type and the second device, the second data to include the recommendation to further establish the first routine to operate on both the first device and the second device upon occurrence of the first trigger event type.

Additionally, or alternatively, the process 1000 may include determining that a preexisting routine associated with the user account data is associated with the first device. The process 1000 may also include determining that the preexisting routine conflicts with a second routine. In these examples, generating the first routine further may include selecting the first routine instead of the second routine based at least in part on a conflict between the preexisting routine and the second routine.

Additionally, or alternatively, the process 1000 may include determining that a preexisting routine associated with the user account data is associated with the first device. The process 1000 may also include determining that the preexisting routine is associated with a third trigger event type that differs from the first trigger event type. The process 1000 may also include determining, based at least in part on the first data, that other devices associated with the user account data are operated utilizing the first trigger event type. In these examples, the second data may represent the recommendation to change the preexisting routine to cause a first action to be performed upon occurrence of a trigger event associated with the first trigger event type instead of the third trigger event type.

Additionally, or alternatively, the process 1000 may include determining, based at least in part on the first data, a second device of the devices that is operated when the first device is operated. The process 1000 may also include predicting a likelihood that the second device would be operated to perform a first action when the first device performs the first action. The process 1000 may also include selecting the second device to be included in the first routine based at least in part on the likelihood that the second device would be operated to perform the first action when the first device performs the first action.

Additionally, or alternatively, the process 1000 may include determining device types associated with the devices and determining a subset of user accounts that include reference devices associated with the device types. The process 1000 may also include querying the subset of user accounts for third data indicating device usage of the reference devices. In these examples, selecting the first trigger event type instead of the second trigger event type may be based at least in part on the third data.

Additionally, or alternatively, the process 1000 may include determining a second device that was most recently associated with to the user account data. The process 1000 may also include determining that a device type of the second device is associated with the first trigger event type. In these examples, selecting the first trigger event type instead of the second trigger event type may be based at least in part on the device type being associated with the first trigger event type.

Figure 11:
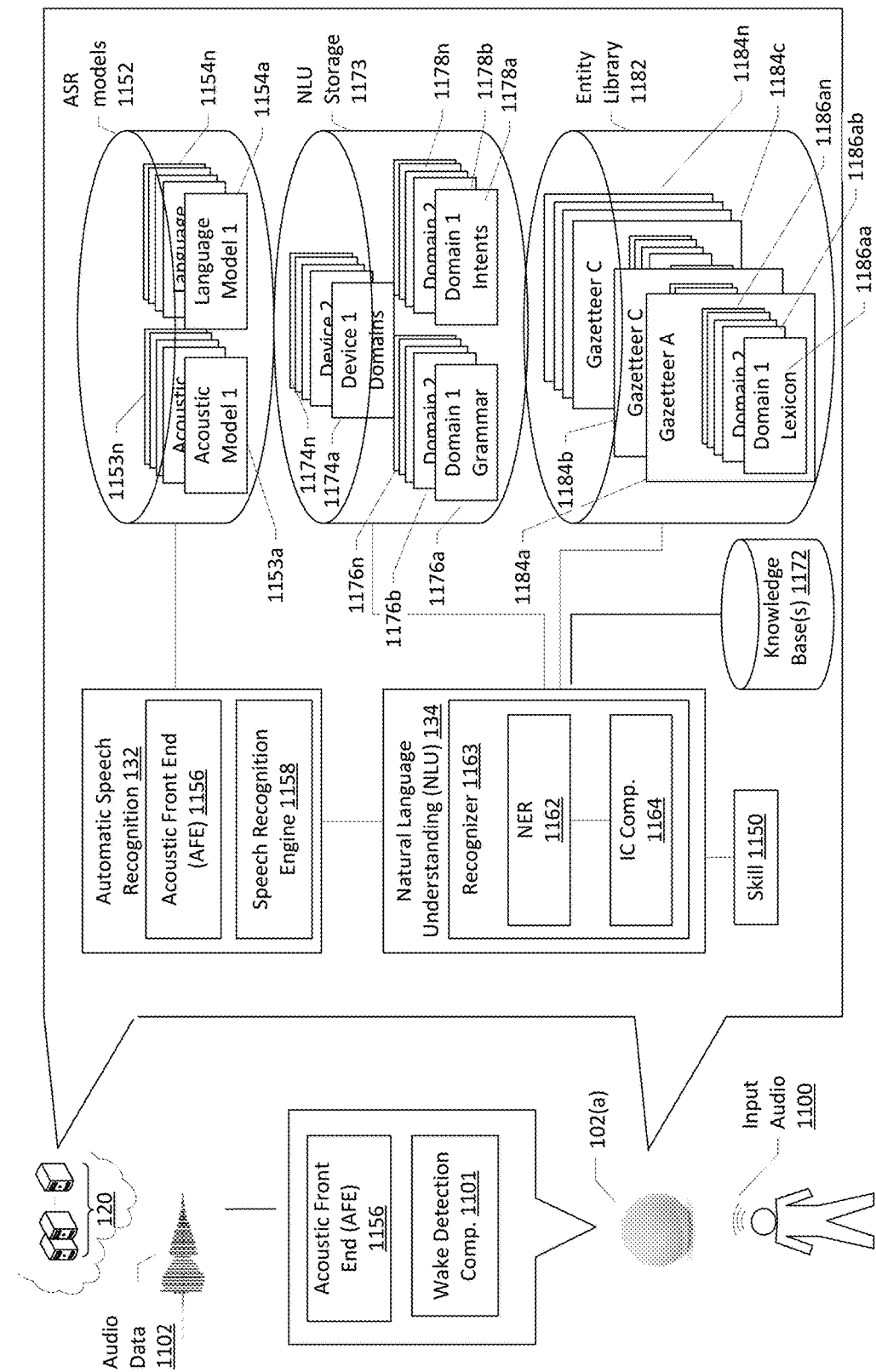
FIG. 11 illustrates a conceptual diagram of components of a speech-processing system for processing audio data provided by one or more devices.

FIG. 11 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 11 may occur directly or across a network 106. An audio capture component, such as a microphone 114 of the device 102, or another device, captures audio 1100 corresponding to a spoken utterance.

The device 102, using a wake word engine 1101, then processes audio data corresponding to the audio 1100 to determine if a keyword (such as a wakeword) is detected in the audio data. Following detection of a wakeword, the device 102 processes audio data 1102 corresponding to the utterance utilizing an ASR component 132. The audio data 1102 may be output from an optional acoustic front end (AFE) 1156 located on the device prior to transmission. In other instances, the audio data 1102 may be in a different form for processing by a remote AFE 1156, such as the AFE 1156 located with the ASR component 132.

The wake word engine 1101 works in conjunction with other components of the user device, for example a microphone to detect keywords in audio 1100. For example, the device may convert audio 1100 into audio data, and process the audio data with the wake word engine 1101 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1101 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1101 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 1102 may include data corresponding to the wakeword. Further, a local device may "wake" upon detection of speech/spoken audio above a threshold, as described herein. An ASR component 132 may convert the audio data 1102 into text. The ASR transcribes audio data into text data representing the words of the speech contained in the audio data 1102. The text data may then be used by other components for various purposes, such as executing system commands, inputting data, etc. A spoken utterance in the audio data is input to a processor configured to perform ASR which then interprets the utterance based on the similarity between the utterance and pre-established language models 1154 stored in an ASR model knowledge base (ASR Models Storage 1152). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1153 stored in an ASR Models Storage 1152), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 132 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1156 and a speech recognition engine 1158. The acoustic front end (AFE) 1156 transforms the audio data from the microphone into data for processing by the speech recognition engine 1158. The speech recognition engine 1158 compares the speech recognition data with acoustic models 1153, language models 1154, and other data models and information for recognizing the speech conveyed in the audio data. The AFE 1156 may reduce noise in the audio data and divide the digitized audio data into frames representing time intervals for which the AFE 1156 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1158 may process the output from the AFE 1156 with reference to information stored in speech/model storage (1152). Alternatively, post front-end processed data (such as feature vectors) may be received by the device executing ASR processing from another source besides the internal AFE. For example, the user device may process audio data into feature vectors (for example using an on-device AFE 1156).

The speech recognition engine 1158 attempts to match received feature vectors to language phonemes and words as known in the stored acoustic models 1153 and language models 1154. The speech recognition engine 1158 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on Light A" The wake detection component may identify the wake word, otherwise described as a trigger expression, "Alexa," in the user utterance and may "wake" based on identifying the wake word. The speech recognition engine 1158 may identify, determine, and/or generate text data corresponding to the user utterance, here "turn on Light A."

The speech recognition engine 1158 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1158 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 134 may include various components, including potentially dedicated processor(s), memory, storage, etc. As shown in FIG. 11, an NLU component 134 may include a recognizer 1163 that includes a named entity recognition (NER) component 1162 which is used to identify portions of query text that correspond to a named entity that may be recognizable by the system. A downstream process called named entity resolution links a text portion to a specific entity known to the system. To perform named entity resolution, the system may utilize gazetteer information (1184a-1184n) stored in entity library storage 1182. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 132 based on the utterance input audio 1100) and attempts to make a semantic interpretation of the text. That is, the NLU process determines the meaning behind the text based on the individual words and then implements that meaning. NLU processing 134 interprets a text string to derive an intent or a desired action from the user as well as the pertinent pieces of information in the text that allow a device (e.g., device 102) to complete that action. For example, if a spoken utterance is processed using ASR 132 and outputs the text "turn on Light A" the NLU process may determine that the user intended to cause a device state of a device named Light A.

The NLU 134 may process several textual inputs related to the same utterance. For example, if the ASR 132 outputs N text segments (as part of an N-best list), the NLU may process all N outputs to obtain NLU results.

As will be discussed further below, the NLU process may be configured to parse and tag to annotate text as part of NLU processing. For example, for the text "turn on Light A," "turn on" may be tagged as a command (to perform device state transition).

To correctly perform NLU processing of speech input, an NLU process 134 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1162 receives a query in the form of ASR results and attempts to identify relevant grammars and lexical information that may be used to construe meaning. To do so, the NLU component 134 may begin by identifying potential domains that may relate to the received query. The NLU storage 1173 includes a database of devices (1174a-1174n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 1163, language model and/or grammar database (1176a-1176n), a particular set of intents/actions (1178a-1178n), and a particular personalized lexicon (1186). Each gazetteer (1184a-1184n) may include domain-indexed lexical information associated with a particular user and/or device. For example, the Gazetteer A (1184*a*) includes domain-index lexical information 1186*aa* to 1186*an*. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1164 parses the query to determine an intent or intents for each identified domain, where the intent corresponds to the action to be performed that is responsive to the query. Each domain is associated with a database (1178*a*-1178*n*) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1164 identifies potential intents for each identified domain by comparing words in the query to the words and phrases in the intents database 1178. In some instances, the determination of an intent by the IC component 1164 is performed using a set of rules or templates that are processed against the incoming text to identify a matching intent.

In order to generate a particular interpreted response, the NER 1162 applies the grammar models and lexical information associated with the respective domain to actually recognize a mention of one or more entities in the text of the query. In this manner, the NER 1162 identifies "slots" or values (i.e., particular words in query text) that may be needed for later command processing. Depending on the complexity of the NER 1162, it may also label each slot with a type of varying levels of specificity (such as noun, place, device name, device location, city, artist name, song name, amount of time, timer number, or the like). Each grammar model 1176 includes the names of entities (i.e., nouns) commonly found in speech about the particular domain (i.e., generic terms), whereas the lexical information 1186 from the gazetteer 1184 is personalized to the user(s) and/or the device. For instance, a grammar model associated with the shopping domain may include a database of words commonly used when people discuss shopping.

The intents identified by the IC component 1164 are linked to domain-specific grammar frameworks (included in 1176) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1176) framework or frameworks may correspond to sentence structures such as "purchase item called 'Item A' from Marketplace A."

For example, the NER component 1162 may parse the query to identify words as subject, object, verb, preposition, etc., based on grammar rules and/or models, prior to recognizing named entities. The identified verb may be used by the IC component 1164 to identify intent, which is then used by the NER component 1162 to identify frameworks. A framework for the intent of "play a song," meanwhile, may specify a list of slots/fields applicable to play the identified "song" and any object modifier (e.g., specifying a music collection from which the song should be accessed) or the like. The NER component 1162 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1162 may search the database of generic words associated with the domain (in the knowledge base 1172). So, for instance, if the query was "identify this song," after failing to determine which song is currently being output, the NER component 1162 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1150. The destination speechlet 1150 may be determined based on the NLU output. For example, if the NLU output includes a command to send a message, the destination speechlet 1150 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1150 may provide some or all of this information to a text-to-speech (TTS) engine. The TTS engine may then generate an actual audio file for outputting the audio data determined by the application (e.g., "okay," or "Light A on").

An NLG component 1151 may be utilized to inserting text into a description as described herein. NLG may include a process for producing natural language output. In examples, artificial intelligence and computational linguistics may be utilized to produce understandable texts in English or other language as appropriate from underlying non-linguistic representations of information. The NLG process may generate text to be utilized in synthesized speech using a list of canned text that available to the system at issue. In other NLG processes, multiple stages of planning and merging information to enable the generation of text that looks natural and does not become repetitive may be utilized. Those stages may include content determination, here based on the specific group name, document structuring to organize the information to be conveyed, aggregation to merge similar sentences and/or words to improve readability, lexical choice, referring expression generation to identity objects, regions, or other known items, and realization where the text to be utilized is actually created.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 134 during runtime operations where NLU operations are performed on text (such as text output from an ASR component 132). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1163. Each recognizer may include various NLU components such as an NER component 1162, IC component 1164 and other components such as an entity resolver, or other components.

For example, a messaging domain recognizer 1163-A (Domain A) may have an NER component 1162-A that identifies what slots (i.e., portions of input text) may correspond to particular words relevant to that domain. The words may correspond to entities such as (for the messaging domain) a recipient. An NER component 1162 may use a machine learning model, such as a domain specific conditional random field (CRF) to both identify the portions corresponding to an entity as well as identify what type of entity corresponds to the text portion. The messaging domain recognizer 1163-A may also have its own intent classification (IC) component 1164-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 120, as illustrated herein are exemplary, and may be located in a stand-alone device or may be included, in whole or in part, as a component of a larger device or system, may be distributed across a network or multiple devices connected by a network, etc.

Figure 12:
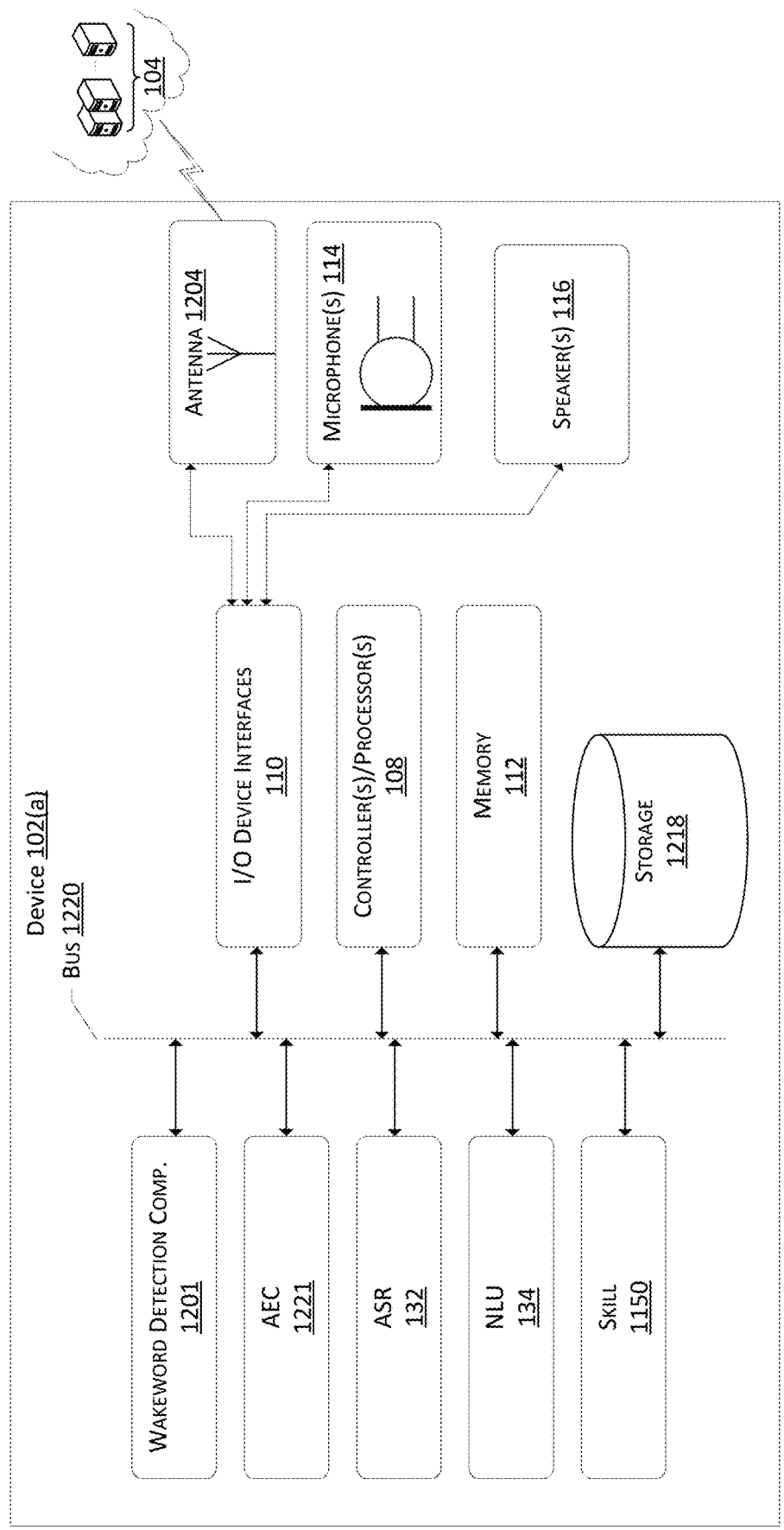
FIG. 12 illustrates a conceptual diagram of components of an example device that may utilized in association with personalized device routines.

FIG. 12 illustrates a conceptual diagram of components of an example connected device from which sensor data may be received for device functionality control utilizing activity prediction. For example, the device may include one or more electronic devices such as voice interface devices (e.g., smart speaker devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102 may be implemented as a standalone device that is relatively simple in terms of functional capabilities with limited input/output components, memory, and processing capabilities. For instance, the device 102 may not have a keyboard, keypad, touchscreen, or other form of mechanical input. In some instances, the device 102 may include a microphone 114, a power source, and functionality for sending generated audio data via one or more antennas 1204 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 114, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 12 may include one or more controllers/processors 108, that may include a central processing unit (CPU) for processing data and computer-readable instructions, and memory 112 for storing data and instructions of the device 102. In examples, the skills and/or applications described herein may be stored in association with the memory 112, which may be queried for content and/or responses as described herein. The device 102 may also be connected to removable or external non-volatile memory and/or storage, such as a removable memory card, memory key drive, networked storage, etc., through input/output device interfaces 110.

Computer instructions for operating the device 102 and its various components may be executed by the device's controller(s)/processor(s) 108, using the memory 112 as "working" storage at runtime. A device's computer instructions may be stored in a non-transitory manner in non-volatile memory 112, storage 1218, or an external device(s). Alternatively, some or all of the executable instructions may be embedded in hardware or firmware on the device 102 in addition to or instead of software.

The device 102 may include input/output device interfaces 110. A variety of components may be connected through the input/output device interfaces 110. Additionally, the device 102 may include an address/data bus 1220 for conveying data among components of the respective device. Each component within a device 102 may also be directly connected to other components in addition to, or instead of, being connected to other components across the bus 1220.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 110 that connect to a variety of components. This wired or a wireless audio and/or video port may allow for input/output of audio/video to/from the device 102. The device 102 may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102(a) (using microphone 114, wakeword detection component 1201, ASR component 132, etc.) may be configured to generate audio data corresponding to captured audio. The device 102 (using input/output device interfaces 110, antenna 1204, etc.) may also be configured to transmit the audio data to the remote system 104 for further processing or to process the data using internal components such as a wakeword detection component 1001.

Via the antenna(s) 1204, the input/output device interface 110 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the system 104 may include an ASR component 132. The ASR component 132 of device 102 may be of limited or extended capabilities. The ASR component 132 may include language models stored in ASR model storage component, and an ASR component 132 that performs automatic speech recognition. If limited speech recognition is included, the ASR component 132 may be configured to identify a limited number of words, such as keywords detected by the device, whereas extended speech recognition may be configured to recognize a much larger range of words.

The device 102 and/or the system 104 may include a limited or extended NLU component 134. The NLU component 134 of device 102 may be of limited or extended capabilities. The NLU component 134 may comprise a name entity recognition module, an intent classification module and/or other components. The NLU component 134 may also include a stored knowledge base and/or entity library, or those storages may be separately located.

In examples, AEC may also be performed by the device 102. In these examples, the operations may include causing the AEC component 1221 to be enabled or otherwise turned on, or the operations may include causing the AEC component 1221 to transition from a first mode to a second mode representing a higher sensitivity to audio data generated by the microphone 114. The AEC component 1221 may utilize the audio data generated by the microphone 114 to determine if an audio fingerprint of the audio data, or portion thereof, corresponds to a reference audio fingerprint associated with the predefined event.

The device 102 and/or the system 104 may also include a speechlet 1150 that is configured to execute commands/functions associated with a spoken command as described herein. The device 102 may include a wakeword detection component 1101, which may be a separate component or may be included in an ASR component 132. The wakeword detection component 1101 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 13:
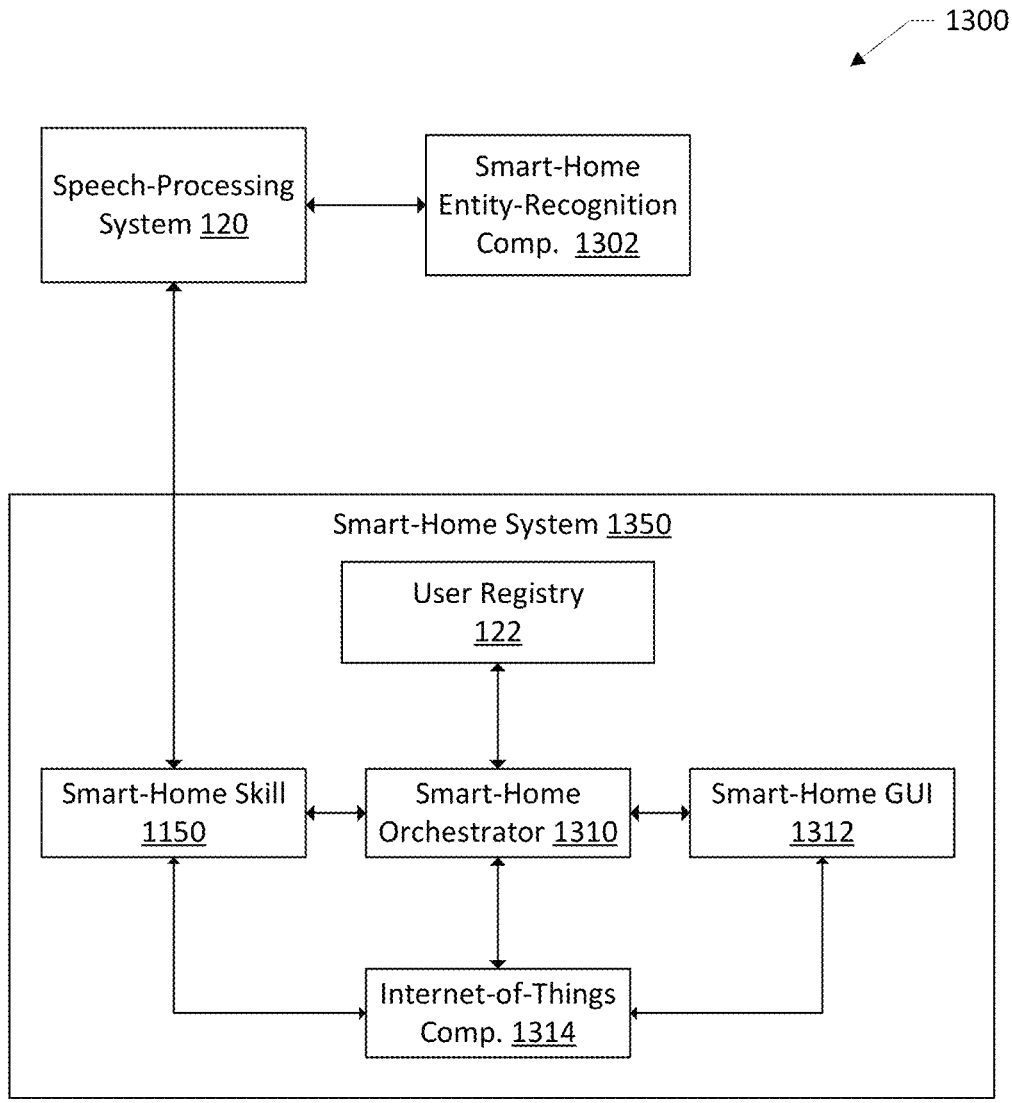
FIG. 13 illustrates a conceptual diagram of components utilized in an example smart home system.

FIG. 13 illustrates a conceptual diagram of example components of a smart-home system that may be utilized for device functionality identification. The smart home system 1350 may include components described above with respect to FIG. 1. The smart home system 1350 may also be configured to send data to and receive data from other components of a system and/or one or more other systems. For example, the other components may include a speech processing system 120. The smart home system 1350 may also include components such as a smart-home orchestrator 1310, a smart-home graphical user interface (GUI) 1312, and/or an internet-of-things component 1314. Each of these components will be described in detail below.

As described herein, a user may interact with a smart device using tactile input to the smart device, voice input to a voice-controlled device, and/or input to an application residing on and/or accessible to a personal device. When a user interacts with a smart device using voice input to a voice-controlled device, audio data representing user utterances may be received at the speech processing system 120. The speech processing system 120 may analyze the audio data and/or corresponding text data generated, by way of example, using an ASR component, to determine that the user utterance represents an intent to control a smart device. To determine the intent associated with the user utterance, the speech processing system 120 may utilize a smart-home entity-recognition component 1302, which may be utilized to inform one or more intents available to the speech processing system 120 and/or to inform one or more values associated with the intents. For example, the user utterance of "turn off bedroom lights" may be analyzed by the speech processing system 120. The smart-home entity-recognition component 1302 may train or otherwise provide data to the speech processing system 120 indicating intents associated with operation of smart devices, such as "turn on," "turn off," "activate," "deactivate," "dim," "brighten," "lock," "unlock," etc. The smart-home entity-recognition component 1302 may additionally, or alternatively, provide data indicating identifiers and/or payloads associated with such intents, such as "light," "lights," "lock," "outlet," "switch," etc. It should be understood that while the smart-home entity-recognition component 1302 is depicted in FIG. 13 as being a component separate from the smart home system 1350, the smart-home entity-recognition component 1302 may be a component of the smart home system 1350.

The speech processing system 120 may be configured to determine that the intent corresponds to an operation configured to be performed by the smart home system 1350, and based at least in part on such a determination, the speech processing system 120 may provide the intent data and/or other data associated with the request to the smart-home skill 1150 of the smart home system 1350. The smart-home orchestrator 1310 may be configured to receive data indicating that the smart-home skill 1150 has been invoked to determine a directive to be performed with respect to a smart device and may query one or more other components of the smart home system 1350 to effectuate the request. For example, the smart-home orchestrator 1310 may query the internet-of-things component 1314 to identify naming indicators associated with smart devices for a particular user account. The internet-of-things component 1314 may query data store(s) and/or the user registry 122 and/or the user account for such naming indicators.

In other examples, such as when the smart-home skill 1150 receives a request to discover a smart device, such as from a smart-device system, the smart-home orchestrator 1310 may query one or more components of the smart home system 1350 to determine associations between smart device identifiers and user account identifiers as described herein. Additionally, or alternatively, as mentioned above, the smart devices may be operated based at least in part on input data received from an application residing on and/or accessible to a personal device, such as a mobile phone and/or computer. The smart-home GUI 1312 may be utilized to receive the input data and/or to display recommendations and/or requests to a user. For example, the smart-home GUI 1312 may be utilized to display a request to confirm that a selected smart device is the desired device to be acted upon.

Figure 14:
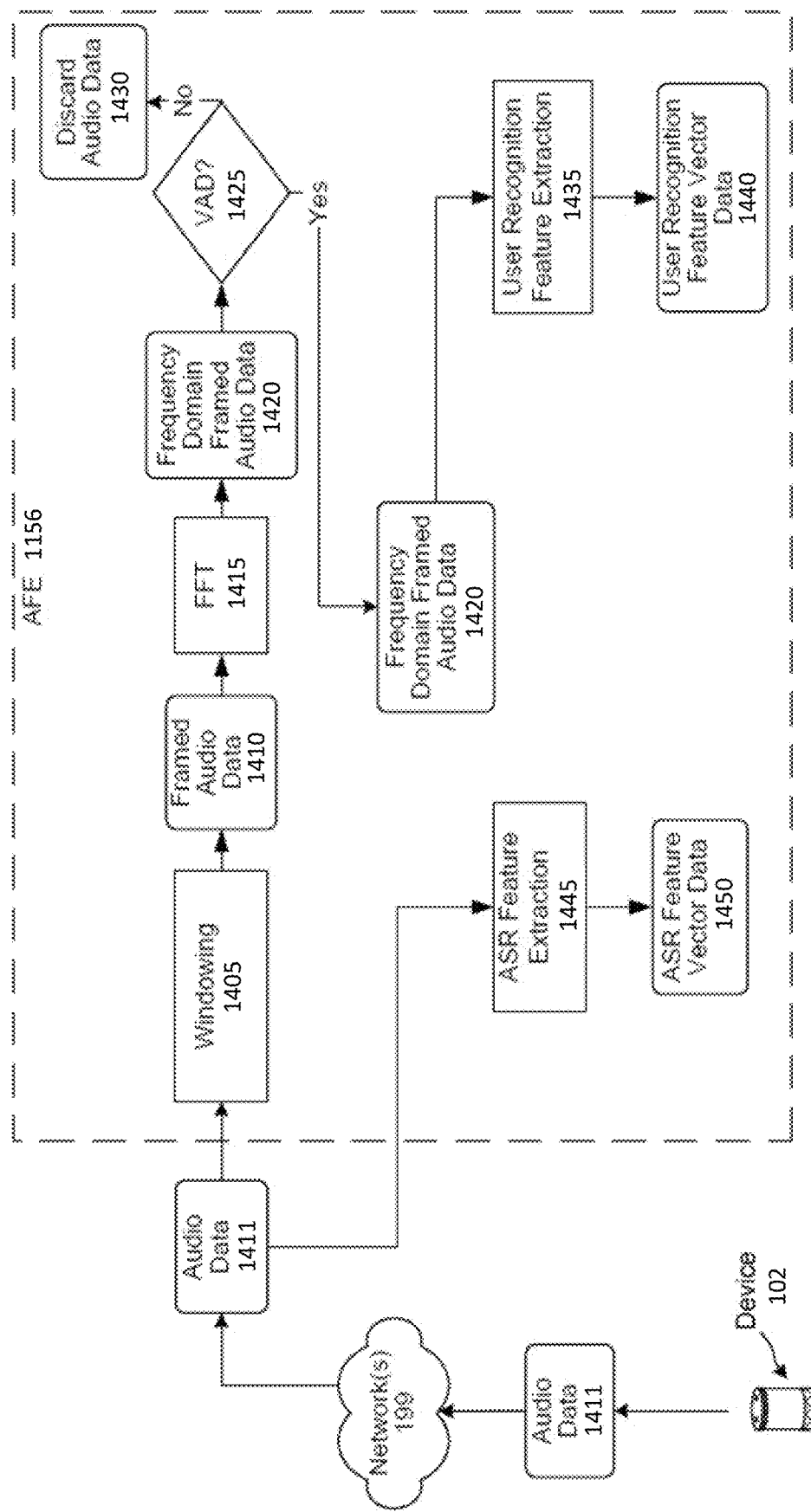
FIG. 14 is a flow diagram illustrating processing that may be performed to prepare audio data for ASR processing and user recognition processing according to embodiments of the present disclosure.

FIG. 14 illustrates processing that may be performed to prepare the audio data 1411 for ASR processing and user recognition processing. As described, the device 102 sends the audio data 1411 through a network(s) 199 to the system (s) for processing. The system(s) may include an acoustic front end (AFE) 1156 (or other component(s)) that performs various functions on the audio data 1411 to prepare the audio data 1411 for further downstream processing, such as ASR processing and/or user recognition processing. For example, the AFE 1156 may include a windowing component 1405 that performs windowing functions on the audio data 1411 to create framed audio data 1410 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 1156 may include a fast Fourier transform (FFT) component 1415 configured to perform FFT to convert the waveforms in each frame of the framed audio data 1410 from its original domain (e.g., time) to a representation in a frequency domain (thereby creating frequency domain framed audio data 1420). Audio processing techniques other than or in addition to FFT may be used to transform audio data (e.g., waveforms) into data that can be processed as needed.

The AFE 1156 may include a voice activity detection (VAD) component 1425 that determines whether voice activity (i.e., speech) is present in the post-FFT waveforms (i.e., frequency domain framed audio data 1420). In doing so, the system(s) may perform VAD operations discussed above. The VAD detector (or other component) may be configured in a different order, for example the VAD detector may operate on the audio data 1011 rather than on the frequency domain framed audio data 1420, may operate on ASR features, etc. Various different configurations of components are possible. If there is no speech in the frequency domain framed audio data 1420, the system(s) discards (1430) the frequency domain framed audio data 1405 (i.e., removes the audio data from the processing stream). If, instead, the system(s) detects speech in the frequency domain framed audio data 1420, the system(s) executes a user recognition feature extraction component 1435 with respect to the frequency domain framed audio data 1420.

The user recognition feature extraction component 1435 may perform frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 1440). The user recognition feature extraction component 1435 may continue to process until voice activity is no longer detected in the frequency domain framed audio data 1420, at which point the system(s) may determine that an endpoint of the speech has been reached.

An ASR feature extraction component 1445 may perform ASR feature extraction on all of the audio data 1411 received from the device 102. Alternatively (not illustrated), the ASR feature extraction component 1445 may only perform ASR feature extraction on audio data including speech (e.g., as indicated by the VAD component 1425). The ASR feature extraction component 1445 and/or the user recognition feature extraction component 1435 may determine values (i.e., features) representing qualities of the frequency domain framed audio data 1420, along with quantitating those features into values (i.e., feature vectors or audio feature vectors). The ASR feature extraction component

1445 may determine ASR feature vector data 1450 useful for ASR processing, and the user recognition feature extraction component 1435 may determine user recognition feature vector data 1440 (sometimes called an i-vector) useful for user recognition processing. The ASR feature vector data 1450 and the user recognition feature vector data 1440 may be the same feature vectors, different feature vectors, or may include some overlapping features. A number of approaches may be used to extract feature vectors from the frequency domain framed audio data 1420, such as MFCCs, PLP techniques, neural network feature vector techniques, linear discriminant analysis, semi-tied covariance matrices, or other approaches known to those skilled in the art.

The ASR feature vector data 1450 may include a different audio feature vector for each audio frame. Thus, for one 25 ms long audio frame, the ASR feature extraction component 1445 may output a single ASR feature vector. The ASR feature vector data 1450 may be input to the ASR component 132.

Depending on system configuration, the user recognition feature extraction component 1435 may output multiple user recognition feature vectors, for example one such vector for each audio frame. Alternatively, the user recognition feature extraction component 1435 may continue to input the frequency domain framed audio data 1420 while the utterance is ongoing (e.g., before the endpoint of the speech is reached in the audio data 1411). While the frequency domain framed audio data 1420 is input, the user recognition feature extraction component 1435 may accumulate or otherwise combine the frequency domain framed audio data 1420 as it comes in. That is, for a certain frame's worth of frequency domain framed audio data 1420 that comes in, the user recognition feature extraction component 1435 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 1435 may depend on what audio qualities are determined to be important for ultimate user recognition processing. Thus, the user recognition feature extraction component 1435 may be trained to isolate and process data that is most useful for user recognition processing. The output of the user recognition feature extraction component 1435 may thus include user recognition feature vector data 1440 that includes values for features useful for user recognition processing. The resulting user recognition feature vector data 1440 may be input to the user recognition engine 999.

The user recognition feature vector data 1440 may include multiple vectors each corresponding to different portions of a spoken user input. Alternatively, the user recognition feature vector data 1440 may be a single vector representing audio qualities of the spoken user input.

Figure 15:
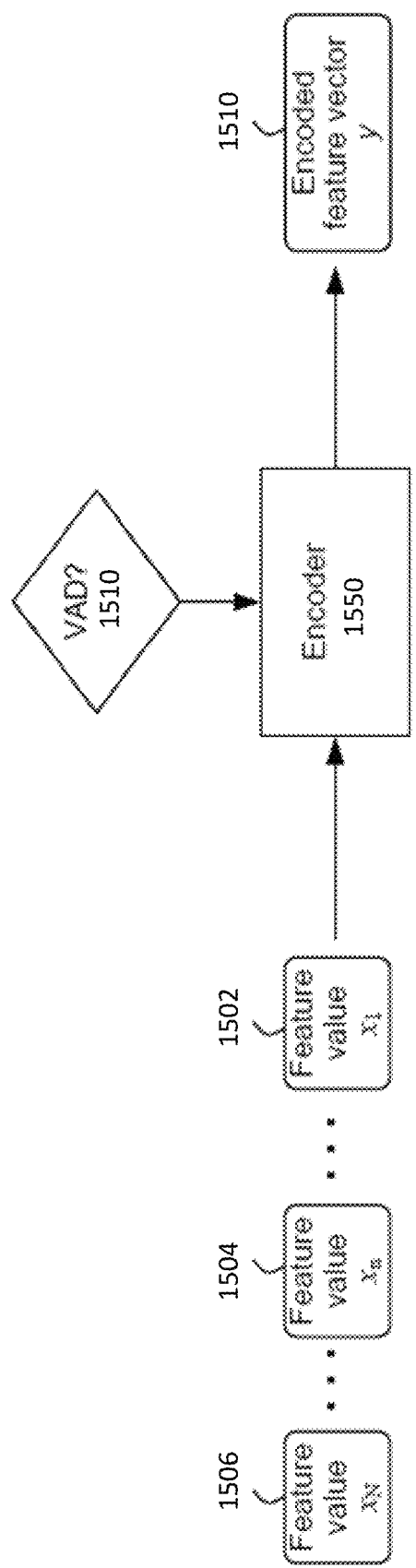
FIG. 15 is a diagram of a vector encoder according to embodiments of the present disclosure.

Referring to FIG. 15, the single vector may be created using an encoder 1550, which can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N) = y$ projects the feature sequence to y, with y being a F-dimensional vector. F is a fixed length of the vector and is configurable depending on use of the encoded vector and other system configurations. As shown in FIG. 15, feature values 1502 through 1506 (which may include feature vectors of the audio data 1411, the frequency domain framed audio data 1420, or the like) may be input into an encoder 1550, which will output an encoded feature vector 1510 that represents the input feature values. Output of the VAD component 1425 may be an input into the encoder 1550 such that the encoder 1550 may only operate when feature values input therein correspond to speech. The individual feature values (e.g., 1502-1506) may correspond to specific audio frames. Regardless of how many feature values are input, any particular encoder 1550 will be configured to output vectors of the same size, thus ensuring a continuity of output encoded vector size from any particular encoder 1550 (though different encoders may output vectors of different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 1550 may be implemented as a neural network (NN), recurrent neural network (RNN), GMM, or other model. One particular example is a long short-term memory (LSTM) RNN. There are a variety of ways for the encoder 1550 to consume data input therein, including but not limited to:

- linear, one direction (forward or backward),
- bi-linear, essentially the concatenation of a forward and a backward embedding, or
- tree, based on parse-tree of the sequence. In addition, an attention model can be used, which is another RNN or deep neural network (DNN) that learns to "attract" attention to certain parts of the input. The attention model can be used in combination with the above methods of consuming the input.

FIG. 15 illustrates operation of the encoder 1550. The input feature value sequence, starting with feature value $x_1$ 1502, continuing through feature value $x_n$ 1504, and concluding with feature value $x_N$ 1506 is input into the encoder 1550. The encoder 1550 may process the input feature values as noted above. The encoder 1550 outputs the encoded feature vector y 1510, which is a fixed length feature vector of length F. Thus, the user recognition feature extraction component 1435 may include an encoder 1550 that receives audio feature values for a particular spoken user input, and outputs a fixed length encoded feature vector y 1510, which may be the user recognition feature/vector data 1440. Thus, in certain system configurations, no matter how long the spoken user input is, or how many acoustic frames worth of feature values are input into the encoder 1550, the output feature vector 1510/1440 will be of the same length, thus allowing for more ease of performing user recognition processing by the user recognition engine 999. To allow for robust system operation, a final vector 1510/1440 may include many dimensions (e.g., several hundred), thus providing many datapoints for downstream consideration.

To determine the user recognition feature vector data 1440, the system(s) may (for example using the VAD component 1425) determine that voice activity is detected in input audio data. This may indicate the beginning of the spoken user input, thus resulting in the system(s) determining that the spoken user input starts at a first point in audio data. Audio processing (for example performed by the windowing component 1405, the FFT component 1415, the ASR feature extraction component 1445, the user recognition feature extraction component 1435, ASR processing, or the like) may continue on audio data starting at the first point and continuing until the VAD component 1425 determines that voice activity is no longer detected at a second point in audio data. Thus, the system(s) may determine that the spoken user input ends at the second point. Thus, the first point may be considered the beginpoint of the spoken user input and the second point may be considered the endpoint of the spoken user input. The VAD component 1425 may signal the user recognition feature extraction component 1435 when the beginpoint and/or endpoint is detected so that the user recognition feature extraction component 1435 may begin processing audio data starting at the beginpoint and ending at the endpoint. Further, audio frames during the spoken user input that do not include speech may be filtered out by the VAD component 1425 and thus not considered by the ASR feature extraction component 1445 and/or the user recognition feature extraction component 1435. The resulting accumulated/processed speech audio data (from beginpoint to endpoint) may then be represented in a single feature vector for the user recognition feature vector data 1440, which may then be used for user recognition processing.

Figure 16:
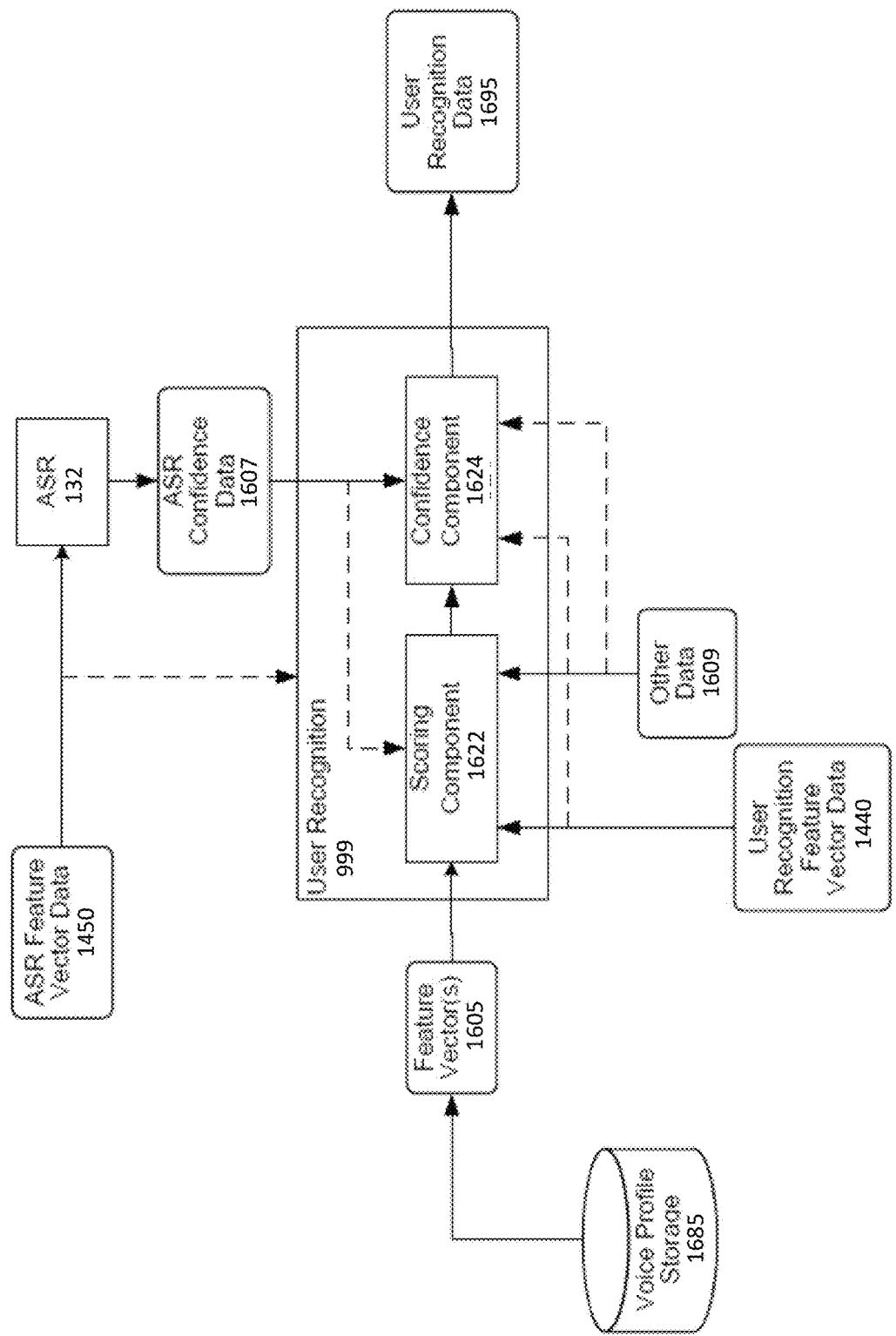
FIG. 16 is a system flow diagram illustrating user recognition according to embodiments of the present disclosure.

FIG. 16 illustrates user recognition processing as may be performed by a user recognition engine 999. The ASR component 132 performs ASR processing on the ASR feature vector data 1450 as described above. ASR confidence data 1607 may be passed to the user recognition engine 999.

The user recognition engine 999 performs user recognition using various data including the user recognition feature vector data 1440, feature vectors 1605 representing explicit and/or anonymous voice profiles, the ASR confidence data 1607, and other data 1609. The user recognition engine 999 may output the user recognition data 1695, which reflects a certain confidence that the user input was spoken by one or more particular users. The user recognition data 1695 may include one or more user identifiers (e.g., corresponding to one or more explicit voice profiles and/or one or more anonymous voice profiles). Each user identifier in the user recognition data 1695 may be associated with a respective confidence value, representing a likelihood that the user input corresponds to the user identifier. A confidence value may be a numeric or binned value.

The feature vector(s) 1605 input to the user recognition engine 999 may correspond to one or more anonymous voice profiles and/or one or more explicit voice profiles. The user recognition engine 999 may use the feature vector(s) 1605 to compare against the user recognition feature vector 1440, representing the present user input, to determine whether the user recognition feature vector 1440 corresponds to one or more of the feature vectors 1605 of the anonymous and/or explicit voice profiles.

Each feature vector 1605 may be the same size as the user recognition feature vector 1440. For example, if the user recognition feature vector 1404 is of size F (for example encoded by the encoder 1550), a feature vector 1605 may also be of size F.

To perform user recognition, the user recognition engine 999 may determine the device 102 from which the audio data 1411 originated. For example, the audio data 1411 may be associated with metadata including a device identifier representing the device 102. Either the device 102 or the system(s) may generate the metadata. The system(s) may determine a group profile identifier associated with the device identifier, may determine user identifiers associated with the group profile identifier, and may include the group profile identifier and/or the user identifiers in the metadata. The system(s) may associate the metadata with the user recognition feature vector 1440 produced from the audio data 1411. The user recognition engine 999 may send a signal to the voice profile storage 1685, with the signal requesting only audio data and/or feature vectors 1605 (depending on whether audio data and/or corresponding feature vectors are stored) associated with the device identifier, the group profile identifier, and/or the user identifiers represented in the metadata. This limits the universe of possible feature vectors 1605 the user recognition engine 999 considers at runtime and thus decreases the amount of time to perform user recognition processing by decreasing the amount of feature vectors 1605 needed to be processed. Alternatively, the user recognition engine 999 may access all (or some other subset of) the audio data and/or feature vectors 1605 available to the user recognition engine 999. However, accessing all audio data and/or feature vectors 1205 will likely increase the amount of time needed to perform user recognition processing based on the magnitude of audio data and/or feature vectors 1605 to be processed.

If the user recognition engine 999 receives audio data from the voice profile storage 1685, the user recognition engine 999 may generate one or more feature vectors 1605 corresponding to the received audio data.

The user recognition engine 999 may attempt to identify the user that spoke the speech represented in the audio data 1411 by comparing the user recognition feature vector 1440 to the feature vector(s) 1605. The user recognition engine 999 may include a scoring component 1622 that determines respective scores indicating whether the user input (represented by the user recognition feature vector 1440) was spoken by one or more particular users (represented by the feature vector(s) 1605). The user recognition engine 999 may also include a confidence component 1624 that determines an overall accuracy of user recognition processing (such as those of the scoring component 1622) and/or an individual confidence value with respect to each user potentially identified by the scoring component 1622. The output from the scoring component 1622 may include a different confidence value for each received feature vector 1605. For example, the output may include a first confidence value for a first feature vector 1605a (representing a first anonymous or explicit voice profile), a second confidence value for a second feature vector 1605b (representing a second anonymous or explicit voice profile), etc. Although illustrated as two separate components, the scoring component 1622 and the confidence component 1624 may be combined into a single component or may be separated into more than two components.

The scoring component 1622 and the confidence component 1624 may implement one or more trained machine learning models (such neural networks, classifiers, etc.) as known in the art. For example, the scoring component 1622 may use probabilistic linear discriminant analysis (PLDA) techniques. PLDA scoring determines how likely it is that the user recognition feature vector 1440 corresponds to a particular feature vector 1605. The PLDA scoring may generate a confidence value for each feature vector 1605 considered and may output a list of confidence values associated with respective user identifiers, anonymous voice profile identifiers, and/or explicit voice profile identifiers. The scoring component 1622 may also use other techniques, such as GMMs, generative Bayesian models, or the like, to determine confidence values.

The confidence component 1624 may input various data including information about the ASR confidence 1607, speech length (e.g., number of frames or other measured length of the user input), audio condition/quality data (such as signal-to-interference data or other metric data), fingerprint data, image data, or other factors to consider how confident the user recognition engine 999 is with regard to the confidence values linking users to the user input. The confidence component 1624 may also consider the confidence values and associated identifiers output by the scoring component 1622. For example, the confidence component 1624 may determine that a lower ASR confidence 1607, or poor audio quality, or other factors, may result in a lower confidence of the user recognition engine 999. Whereas a higher ASR confidence 1607, or better audio quality, or other factors, may result in a higher confidence of the user recognition engine 999. Precise determination of the confidence may depend on configuration and training of the confidence component 1624 and the model(s) implemented thereby. The confidence component 1624 may operate using a number of different machine learning models/techniques such as GMM, neural networks, etc. For example, the confidence component 1624 may be a classifier configured to map a score output by the scoring component 1622 to a confidence value.

The user recognition engine 999 may output user recognition data 1695 specific to a single user identifier, anonymous voice profile identifier, or explicit voice profile identifier (or one or more user identifiers, one or more anonymous voice profile identifiers, and/or one or more explicit voice profile identifiers in the form of an N-best list). For example, the user recognition engine 999 may output user recognition data 1695 with respect to each received feature vector 1605. The user recognition data 1695 may include numeric confidence values (e.g., 0.0-1.0, 0-1000, or whatever scale the system is configured to operate). Thus the user recognition data 1695 may output an N-best list of potential users with numeric confidence values (e.g., user identifier 123-0.2, anonymous voice profile identifier 234-0.8). Alternatively or in addition, the user recognition data 1695 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition engine 999 may output an N-best list of potential users with binned confidence value (e.g., user identifier 123—low, anonymous voice profile identifier 234—high). Combined binned and numeric confidence value outputs are also possible. Rather than a list of identifiers and their respective confidence values, the user recognition data 1695 may only include information related to the top scoring identifier as determined by the user recognition engine 999. The user recognition engine 999 may also output an overall confidence value that the individual confidence values are correct, where the overall confidence value indicates how confident the user recognition engine 999 is in the output results. The overall confidence value may be determined by the confidence component 1224.

The confidence component 1624 may determine differences between individual confidence values when determining the user recognition data 1695. For example, if a difference between a first confidence value and a second confidence value is large, and the first confidence value is above a threshold confidence value, then the user recognition engine 999 is able to recognize a first user (associated with the feature vector 1605 associated with the first confidence value) as the user that spoke the user input with a much higher confidence than if the difference between the confidence values were smaller.

The user recognition engine 999 may perform thresholding to avoid incorrect user recognition data 1695 being output. For example, the user recognition engine 999 may compare a confidence value output by the confidence component 1624 to a threshold confidence value. If the confidence value does not satisfy (e.g., does not meet or exceed) the threshold confidence value, the user recognition engine 999 may not output user recognition data 1695, or may only include in that data 1695 an indicator that a user speaking the user input could not be recognized. Further, the user recognition engine 999 may not output user recognition data 1695 until enough user recognition feature vector data 1640 is accumulated and processed to verify a user above a threshold confidence value. Thus the user recognition engine 999 may wait until a sufficient threshold quantity of audio data of the user input has been processed before outputting user recognition data 1695. The quantity of received audio data may also be considered by the confidence component 1624.

The user recognition engine 999 may be defaulted to output binned (e.g., low, medium, high) user recognition confidence values. However, such may be problematic in certain situations. For example, if the user recognition engine 999 computes a single binned confidence value for multiple feature vectors 1605, the system may not be able to effectively determine which user originated the user input. In this situation, the user recognition engine 999 may be configured to override its default setting and output numeric confidence values. This enables the system to determine a user, associated with the highest numeric confidence value, originated the user input.

The user recognition engine 999 may use other data 1609 to inform user recognition processing. A trained model(s) or other component of the user recognition engine 999 may be trained to take other data 1609 as an input feature when performing user recognition processing. Other data 1609 may include a variety of data types depending on system configuration and may be made available from other sensors, devices, or storage. The other data 1609 may include a time of day at which the audio data 1411 was generated by the device 102 or received from the device 102, a day of a week in which the audio data audio data 1411 was generated by the device 102 or received from the device 102, etc.

The other data 1609 may include image data or video data. For example, facial recognition may be performed on image data or video data received from the device 102 from which the audio data 1411 was received (or another device). Facial recognition may be performed by the user recognition engine 999, or another component of the system(s). The output of facial recognition processing may be used by the user recognition engine 999. That is, facial recognition output data may be used in conjunction with the comparison of the user recognition feature vector 1440 and one or more feature vectors 1605 to perform more accurate user recognition processing.

The other data 1609 may include location data of the device 102. The location data may be specific to a building within which the device 102 is located. For example, if the device 102 is located in user A's bedroom, such location may increase a user recognition confidence value associated with user A and/or decrease a user recognition confidence value associated with user B.

The other data 1609 may include data indicating a type of the device 102. Different types of devices may include, for example, a smart watch, a smart phone, a tablet computer, and a vehicle. The type of the device 102 may be indicated in a profile associated with the device 102. For example, if the device 102 from which the audio data 1411 was received is a smart watch or vehicle belonging to a user A, the fact that the device 102 belongs to user A may increase a user recognition confidence value associated with user A and/or decrease a user recognition confidence value associated with user B.

The other data 1609 may include geographic coordinate data associated with the device 102. For example, a group profile associated with a vehicle may indicate multiple users (e.g., user A and user B). The vehicle may include a global positioning system (GPS) indicating latitude and longitude coordinates of the vehicle when the audio data 1411 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 102. The global coordinates and associated locations may also or alternatively be associated with one or more user profiles.

The other data 1609 may include data representing activity of a particular user that may be useful in performing user recognition processing. For example, if a user has recently entered a code to disable a home security alarm, and the audio data 1411 was received from a device 102 represented in a group profile associated with the home, signals from the home security alarm about the disabling user, time of disabling, etc. may be reflected in the other data 1609 and considered by the user recognition engine 999. If a mobile device (such as a smart phone, Tile, dongle, or other device) known to be associated with a particular user is detected proximate to (for example physically close to, connected to the same WiFi network as, or otherwise nearby) the device 102, this may be reflected in the other data 1609 and considered by the user recognition engine 999.

Depending on system configuration, the other data 1609 may be configured to be included in the user recognition feature vector data 1440 (for example using the encoder 1550) so that all the data relating to the user input to be processed by the scoring component 1622 may be included in a single feature vector. Alternatively, the other data 1609 may be reflected in one or more different data structures to be processed by the scoring component 1622.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The foregoing illustrates processes that may be performed at runtime to recognize a user that spoke a user input. As indicated previously, the system(s) may be configured to update voice profiles during offline operations. Such voice profile updating may use audio data representing previous spoken user inputs, which were not requested by the system(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
determining devices that are associated with user account data, wherein the devices are configured to perform operations in response to user input;
generating first data indicating device usage of the devices, the device usage indicating trigger event types associated with device operation;
determining, from the first data indicating historical usage of the trigger event types in association with a first device of the devices, a first routine to recommend, the first routine indicating that the first device is to perform a first action in response to a first trigger event occurring, wherein the first trigger event is associated with a first trigger event type of the trigger event types;
determining, from the first data indicating the historical usage of the trigger event types in association with the first device, a second routine to recommend, the second routine indicating that the first device is to perform the first action in response to a second trigger event occurring, wherein the second trigger event is associated with a second trigger event type that differs from the first trigger event type;

determining, from the first data, that the devices are operated in response to the first trigger event type more frequently than to the second trigger event type;

determining that a preexisting routine associated with the user account data conflicts with the second routine;

selecting the first routine to recommend based on the first routine having the first trigger event type, which is more frequently used with the first device than the second trigger event type, and the preexisting routine conflicting with the second routine; and sending, to at least one of the devices, second data representing a recommendation to establish the first routine.

2. The system of claim 1, the operations further comprising:

determining, from the user account data, that the first device is associated with a device group that includes a second device;

determining, from the first data, that the first trigger event type is associated with control of the first device and the second device individually instead of control of the first device and the second device at a same time; and determining the first routine to be established in association with the first device instead of the device group in response to the first trigger event type being associated with control of the first device and the second device individually, wherein the recommendation establishes the first routine in association with the first device.

3. The system of claim 1, the operations further comprising:

determining that the preexisting routine associated with the user account data is associated with the first trigger event;

determining that the preexisting routine is associated with a second device instead of the first device;

determining, from the user account data, that the first device is associated with the second device; and determining, in response to the preexisting routine being associated with the first trigger event and the first device being associated with the second device, the second data to include the recommendation to further establish the first routine to operate on both the first device and the second device upon occurrence of the first trigger event.

4. A method, comprising:

determining a first device that is associated with user account data;

generating first data indicating device usage of the first device;

determining, based at least in part on the first data, a first trigger event type to recommend for a first routine, the first trigger event type determined based at least in part on the first data indicating how at least the first device is operated in association with the first trigger event type;

determining, based at least in part on the first data, a second trigger event type to recommended for the first routine, the second trigger event type determined based at least in part on the first data indicating how at least the first device is operated in association with the second trigger event type;

selecting, based at least in part on the first data, the first trigger event type to associate with the first routine;

determining that a preexisting routine associated with the user account data conflicts with a second routine;

selecting the first routine to recommend based at least in part on the preexisting routine conflicting with the second routine; and sending second data representing a recommendation to establish the first routine associated with the first trigger event type.

5. The method of claim 4, further comprising:

determining that the first device is associated with a device group that includes a second device;

determining third data indicating that the first trigger event type is associated with individual control of the first device and the second device; and determining to recommend the first routine to be established in association with the first device instead of the device group based at least in part on the third data, wherein the recommendation establishes the first routine in association with the first device.

6. The method of claim 4, further comprising:

determining that the preexisting routine associated with the user account data is associated with the first trigger event type;

determining that the preexisting routine is associated with a second device; and determining, based at least in part on the preexisting routine being associated with the first trigger event type and the second device, the second data to include the recommendation to further establish the first routine to operate on both the first device and the second device upon occurrence of the first trigger event type.

7. The method of claim 4, further comprising:

determining that the preexisting routine is associated with a third trigger event type that differs from the first trigger event type; and determining, based at least in part on the first data, that other devices associated with the user account data are operated utilizing the first trigger event type, wherein the second data represents the recommendation to change the preexisting routine to cause a first action to be performed upon occurrence of a trigger event associated with the first trigger event type instead of the third trigger event type.

8. The method of claim 4, further comprising:

determining, based at least in part on the first data, a second device that is operated when the first device is operated;

predicting a likelihood that the second device would be operated to perform a first action when the first device performs the first action; and selecting the second device to be included in the first routine based at least in part on the likelihood that the second device would be operated to perform the first action when the first device performs the first action.

9. The method of claim 4, further comprising:

determining a device type associated with the first device;

determining a subset of user accounts that include reference devices associated with the device types; and querying the subset of user accounts for third data indicating device usage of the reference devices, and wherein selecting the first trigger event type is based at least in part on the third data.

10. The method of claim 4, further comprising:

determining a second device that was most recently associated with to the user account data; and determining that a device type of the second device is associated with the first trigger event type, and wherein selecting the first trigger event type is based at least in part on the device type being associated with the first trigger event type.

11. The method of claim 4, further comprising determining a routine template to utilize for the first routine based at least in part on the first data.

12. The method of claim 4, further comprising determining a timing of the first routine based at least in part on the first data.

13. The method of claim 4, further comprising determining text data to represent the recommendation, the text data based at least in part on the first data.

14. A system, comprising:
one or more processors; and
non-transitory computer-readable media storing computer-executable instructions that, when executed by the one or more processors, cause the one or more processors to perform operations comprising:
determining a first device that is associated with user account data;
generating first data indicating device usage of the first device;
determining, based at least in part on the first data, a first trigger event type to recommend for a first routine, the first trigger event type determined based at least in part on the first data indicating how at least the first device is operated in association with the first trigger event type;
determining, based at least in part on the first data, a second trigger event type to recommended for the first routine, the second trigger event type determined based at least in part on the first data indicating how at least the first device is operated in association with the second trigger event type;
selecting, based at least in part on the first data, the first trigger event type to associate with the first routine;
determining that a preexisting routine associated with the user account data conflicts with a second routine;
selecting the first routine to recommend based at least in part on the preexisting routine conflicting with the second routine; and
sending second data representing a recommendation to establish the first routine associated with the first trigger event type.

15. The system of claim 14, the operations further comprising:
determining that the first device is associated with a device group that includes a second device;
determining that the first device is associated with a device group that includes a second device;
determining third data indicating that the first trigger event type is associated with individual control of the first device and the second device; and
determining to recommend the first routine to be established in association with the first device instead of the device group based at least in part on the third data, wherein the recommendation establishes the first routine in association with the first device.

16. The system of claim 14, the operations further comprising:
determining that the preexisting routine associated with the user account data is associated with the first trigger event type;
determining that the preexisting routine is associated with a second device; and
determining, based at least in part on the preexisting routine being associated with the first trigger event type and the second device, the second data to include the recommendation to further establish the first routine to operate on both the first device and the second device upon occurrence of the first trigger event type.

17. The system of claim 14, the operations further comprising:
determining that the preexisting routine is associated with a third trigger event type that differs from the first trigger event type; and
determining, based at least in part on the first data, that other devices associated with the user account data are operated utilizing the first trigger event type, wherein the second data represents the recommendation to change the preexisting routine to cause a first action to be performed upon occurrence of a trigger event associated with the first trigger event type instead of the third trigger event type.

18. The system of claim 14, the operations further comprising:
determining, based at least in part on the first data, a second device that is operated when the first device is operated;
predicting a likelihood that the second device would be operated to perform a first action when the first device performs the first action; and
selecting the second device to be included in the first routine based at least in part on the likelihood that the second device would be operated to perform the first action when the first device performs the first action.

19. The system of claim 14, the operations further comprising:
determining a device type associated with the first device;
determining a subset of user accounts that include reference devices associated with the device types; and
querying the subset of user accounts for third data indicating device usage of the reference devices, and wherein selecting the first trigger event type is based at least in part on the third data.

20. The system of claim 14, the operations further comprising:
determining a second device that was most recently associated with to the user account data; and
determining that a device type of the second device is associated with the first trigger event type, and wherein selecting the first trigger event type is based at least in part on the device type being associated with the first trigger event type.

* * * * *